(12) United States Patent  (10) Patent No.: US 7,661,701 B2
Hirata  (45) Date of Patent: Feb. 16, 2010

(54) CURTAIN AIRBAG DEVICE

(75) Inventor: Motoharu Hirata, Hiroshima (JP)

(73) Assignee: Mazda Motor Corporation (JP)

( * ) Notice: Subject to any disclaimer, the term of this patent is extended or adjusted under 35 U.S.C. 154(b) by 244 days.

(21) Appl. No.: 11/503,137

(22) Filed: Aug. 14, 2006

(65) Prior Publication Data

US 2007/0046001 A1    Mar. 1, 2007

(30) Foreign Application Priority Data

Aug. 23, 2005  (JP)  ............................. 2005-241362
May 31, 2006  (JP)  ............................. 2006-152428

(51) Int. Cl.
    *B60R 21/16*    (2006.01)
(52) U.S. Cl. .................. 280/730.2; 280/743.2; 280/749
(58) Field of Classification Search ............... 280/730.2, 280/743.2, 749
    See application file for complete search history.

(56) References Cited

U.S. PATENT DOCUMENTS

| 6,095,551 | A  | * | 8/2000  | O'Docherty    | 280/730.2 |
| 6,505,853 | B2 | * | 1/2003  | Brannon et al.| 280/730.2 |
| 6,557,892 | B2 | * | 5/2003  | Herzog        | 280/743.2 |
| 6,634,671 | B2 | * | 10/2003 | Heigl et al.  | 280/743.2 |
| 6,695,347 | B2 | * | 2/2004  | Sonnenberg et al. | 280/743.2 |
| 6,709,008 | B2 | * | 3/2004  | McGee et al.  | 280/729 |
| 6,709,010 | B2 | * | 3/2004  | Dominissini et al. | 280/730.2 |
| 6,733,035 | B2 | * | 5/2004  | Thomas et al. | 280/730.2 |
| 7,219,921 | B2 | * | 5/2007  | Noguchi       | 280/730.2 |
| 7,461,858 | B2 | * | 12/2008 | Hirata        | 280/730.2 |
| 2003/0001364 | A1 | * | 1/2003 | Welch et al.  | 280/730.2 |
| 2003/0090091 | A1 | * | 5/2003 | Dominissini et al. | 280/730.2 |
| 2003/0098573 | A1 | * | 5/2003 | Sonnenberg et al. | 280/743.2 |
| 2004/0066022 | A1 |   | 4/2004 | Mori et al.   |         |
| 2005/0134030 | A1 | * | 6/2005 | Noguchi et al.| 280/730.2 |
| 2005/0140124 | A1 | * | 6/2005 | Noguchi et al.| 280/730.2 |

FOREIGN PATENT DOCUMENTS

| EP | 1384632     | 1/2004 |
| EP | 1547875     | 6/2005 |
| JP | 2003-034209 | 4/2003 |

OTHER PUBLICATIONS

European Search Report, EP 06017462, Dated May 25, 2007.

* cited by examiner

*Primary Examiner*—Eric Culbreth
(74) *Attorney, Agent, or Firm*—Studebaker & Brackett PC; Donald R. Studebaker

(57) ABSTRACT

According to the inflation of the curtain, its tip portion moves away from the first window side and comes to engages with support portions. At the same time, a tether moves from the side of the window side to the support portions and comes to be positioned across the window portion. Thereby, the window portion can be properly covered by the curtain airbag.

11 Claims, 15 Drawing Sheets

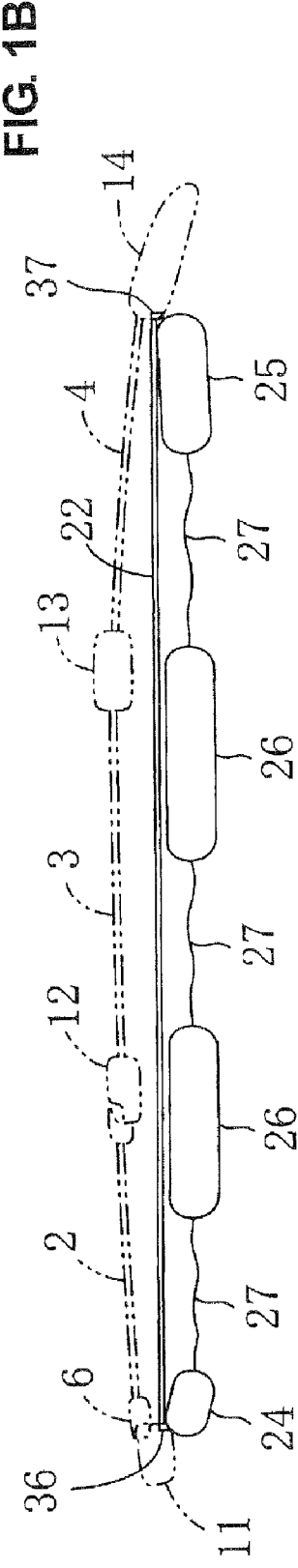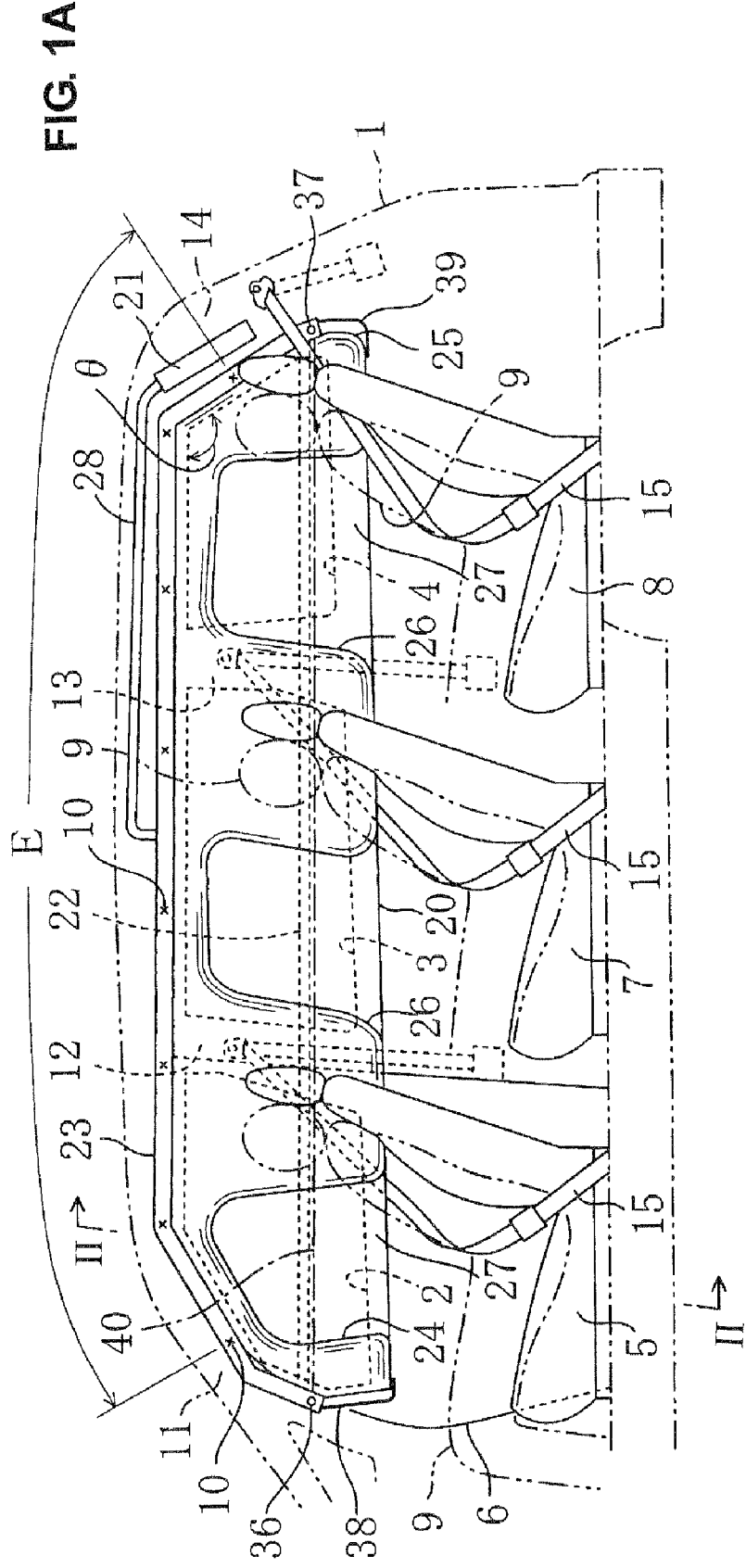

CURTAIN AIRBAG DEVICE

BACKGROUND OF THE INVENTION

The present invention relates to a curtain airbag device that promptly covers a window portion of a vehicle, such as an automotive vehicle, train, ship, aircraft, or space vehicle, or a structure, such as a house, building, or space station.

A curtain airbag device, in which a curtain-shaped airbag is accommodated at a periphery of a window portion of a vehicle and the airbag is inflated by gas that is supplied at a vehicle crash or a rollover so as to cover the window portion promptly, is generally known. In this device, a passenger could not be protected properly by the curtain airbag device unless a proper tension is provided at the curtain. For example, in a case where the curtain is folded and accommodated at a portion along one window side and both window sides next to this window side of a rectangular window portion, the curtain may be inflated with its tip portion having a total length of these three window sides. Namely, the length of the free tip portion of the curtain inflated becomes relatively long, so the curtain tends to be turned up even with a relatively small force applied. As a result, the protection of the passenger could not be properly attained.

In view of the above problem, there are generally provided a plurality of inflatable portions (bags) that extend from one window side of the window portion toward the tip portion of the curtain so that an entire width of the curtain in an inflated state can be reduced by these inflatable portions, namely the length of the free tip portion of the curtain can be shorter, thereby providing a large tension at the curtain. However, it may be difficult to obtain a sufficiently large enough tension. Further, since considerably large inflatable portions may be required to cover a large window portion, a large-sized inflator may be also necessary to supply a large amount of gas to the large inflatable portions. Thereby, application of the curtain airbag device to the large window portion would be difficult.

US Patent Application Publication No. 2004/0066022 A1 discloses a curtain airbag device for a vehicle back window, in which a curtain portion is placed in the folded state at an upper peripheral portion of the back window and tension-providing support points are provided respectively at middle portions of the both-side peripheral portions of the back window, wherein the curtain portion is inflated downward from the tension-providing support points, thereby generating the tension with the tension-providing support points.

The above-described patent publication also discloses another curtain airbag device, in which there are provided guide rails extending vertically at the both-end portions of the back window, wherein the curtain portion placed at the upper peripheral portion is moved down along the guide rails, thereby lowering a tension line by moving the tension-providing support points downward.

However, in a case where the tension line is lowered by moving down the tension-providing support points as described above, a distance between both tension-providing portions by way of the upper peripheral portion of the window portion becomes relatively long. Namely, the length of the curtain located between the tension-providing portions (the width of the curtain) in the inflated state becomes considerably long, and therefore a large amount of gas supply would be required to inflate the large inflatable portions for generating a desirable tension properly.

Further, since the tension-providing portions move as described above, the guide rails would generate a sliding resistance for the inflation of the curtain. Thereby, a smooth and prompt inflation of the curtain could not be attained properly.

SUMMARY OF THE INVENTION

In view of the above-described problems, the present invention has an object to provide a curtain airbag device that can prevent a curtain from being moved improperly by pushing and thereby protect any persons or objects in vehicles or structures surely.

According to the present invention, there is provided a curtain airbag device, which is applicable to a window portion having one or more windows, comprising a curtain including an inflatable portion, the curtain being configured to be accommodated at least at a first window side of a periphery of the window portion in a folded state and to be inflated so as to cover at least part of the window portion with the inflatable portion to which gas is supplied, a gas supply device operative to supply the gas to the inflatable portion of the curtain, a support portion provided at a specified portion of a second window side that is provided next to the first window side, the specified portion being located away from the first window side, an engagement portion provided at a side portion of the curtain that is located on a side of the second window side, the engagement portion being configured so as to be located at a position that is closer to the first window side relative to the support portion in the folded state of the curtain and to be moved toward the support portion so as to engage with the support portion as a tip portion of the curtain moves in an inflation direction according to the inflation of the curtain, and a tether, one end of which is connected to the engagement portion or a portion near the engagement portion of the curtain and the other end of which is connected to a specified portion of the periphery of the window portion other than the second window side or a peripheral portion of the curtain that is restrained by the specified portion of the periphery of the window portion when the curtain is in the inflated state, the tether being configured so as to be accommodated at the periphery of the window portion with the curtain and to extend according to the inflation of the curtain from a side of the support portion to a side of the specified portion of the periphery of the window portion across the window portion, whereby a tension can be provided to the curtain.

Accordingly, when the gas is supplied to the inflatable portion of the curtain, the tip portion of the curtain moves in the inflation direction according to the inflation of the curtain. Thereby, the engagement portion is moved along the window periphery from the first window side to the second window side, and engages with the support portion provided at the second window side. Thus, the side portion of the curtain is restrained by the support portion.

Meanwhile, since the tether is connected to the engagement portion or the portion near the engagement portion of the curtain, the tether's one end is moved toward the support portion according to the curtain inflation, thereby the tether extends, across the window portion, from the side of the support portion to the side of the specified portion of the periphery of the window portion. Accordingly, the tether can prevent the curtain from being moved improperly by pushing, and thus any persons or objects in vehicles or structures can be surely protected.

Further, since the tether's one end is moved to the support portion of the second window side along with the engagement portion of the curtain according to the curtain inflation, there may be no need for any moving device like a guide rail. Thus, the structure can be made simpler.

Herein, the present curtain airbag device may be applied to any window portions having any overall shape, such as triangle, quadrilateral, or any other polygon, and any side line, such as straight line or curved line.

The tether may be provided so as to be located inside or outside the curtain.

The specified portion of the periphery of the window portion other than the second window side, to which the tether's other end is connected, may be the first window side or any other window side. Also, the other end of the tether may be connected to the portion near the first window side or a portion near another window side. Further, the support portion may be provided at another window side that is located facing the second window side, and the engagement portion that is moved along this window side facing the second window side according to the curtain inflation so as to engage with this support portion may be provided at the curtain. Herein, the other end of the tether may be connected to this engagement portion or a portion near this engagement portion.

The curtain may be provided to cover an entire area of the window portion or a partial area of the window portion. In a case where the curtain covers partially the window portion, an uncovered area can be generated, and so this uncovered area generated may facilitate letting any persons or objects get out of this uncovered area outside vehicles or structures.

Further, the curtain may be accommodated at the first window side in a state where it is folded in bellows shape or roll shape.

According to an embodiment of the present invention, the support portion comprises a second-window-side support portion and a third-window-side support portion, the second-window-side support portion being provided at the specified portion of the second window side, the third-window-side support portion being provided at another specified portion of a third window side that is provided next to the first window side on an opposite side to the second window side and the specified portion of the third window side being located away from the first window side, the engagement portion comprises a second-window-side engagement portion and a third-window-side engagement portion, the second-window-side engagement portion being provided at the side portion of the curtain that is located on the side of the second window side and being configured so as to be located at the position that is closer to the first window side relative to the second-window-side support portion in the folded state of the curtain and to be moved toward the second-window-side support portion so as to engage with the second-window-side support portion as the tip portion of the curtain moves in the inflation direction according to the inflation of the curtain, the third-window-side engagement portion being provided at a side portion of the curtain that is located on a side of the third window side and being configured so as to be located at a position that is closer to the first window side relative to the third-window-side support portion in the folded state of the curtain and to be moved toward the third-window-side support portion so as to engage with the third-window-side support portion as the tip portion of the curtain moves in the inflation direction according to the inflation of the curtain, and the tether connects the second-window-side engagement portion or a portion near the second-window-side engagement portion of the curtain to the third-window-side engagement portion or a portion near the third-window-side engagement portion of the curtain, the tether being configured so as to be accommodated at the periphery of the window portion with the curtain and to extend according to the inflation of the curtain across the window portion from the second window side to the third window side, whereby a tension can be provided to the curtain between the second-window-side support portion and the third-window-side support portion.

Namely, according the above embodiment, the second-window-side engagement portion is moved from the side of the first window side toward the second-window-side support portion so as to engage with the second-window-side support portion according to the inflation of the curtain, and the third-window-side engagement portion is moved from the side of the first window side toward the third-window-side support portion so as to engage with the third-window-side support portion according to the inflation of the curtain. And, the tether extends across the window portion from the second-window-side support portion to the third-window-side support portion.

Accordingly, since it is disposed along a tension line connecting the both support portions with the engagement of the respective support portions and the respective engagement portions, the tether can prevent the curtain from being moved improperly by pushing, and thus any persons or objects in vehicles or structures can be surely protected.

According to another embodiment of the present invention, the curtain is configured to be accommodated at least at the first window side and the second window side of the periphery of the window portion in the folded state, the engagement portion is provided at the curtain, and a length of the tether extending across the window portion is configured to be shorter than a length of a corresponding part of the curtain in a state in which the curtain is inflated without the inflation of the inflatable portion.

Thereby, since the tether has a stronger tension than the curtain, backup of the protection by the curtain can be improved.

According to another embodiment of the present invention, the curtain is configured to cover the window portion of a vehicle, and the tether is configured to extend outside the inflatable portion of the curtain in the inflated state.

Thereby, since the passenger is supported by the tether via the curtain, without direct contacting, the protection of the passenger's body can be improved. Further, when the passenger moves the curtain toward the first window side, it becomes easy for the passenger to get out of a space between the tether and the window periphery outside the vehicle.

According to another embodiment of the present invention, the tether is configured to extend beside the inflatable portion of the curtain in the inflated state.

Thereby, since the tension line may not be provided at the curtain itself, the smooth gas supply to the inflatable portion can be obtained and thereby the inflation of the inflatable portion can be attained. Thus, the smooth and proper inflation of the curtain can be improved.

According to another embodiment of the present invention, a band is provided at a side portion of the curtain, a base-end portion of the band is connected to a middle portion of the side portion of the curtain and a tip-end portion of the band is connected to a portion that is located at a side of the tip portion of the curtain relative to the middle portion of the side portion of the curtain. The support portion is configured to be located between the side portion of the curtain and the band such that the tip-end portion of the band is located on a side of the support portion that is opposite to the first window side in the folded state of the curtain and the base-end portion of the band as the engagement portion is moved toward the support portion so as to engage with the support portion according to the inflation of the curtain.

Thereby, the tip-end portion of the band is moved forward in the inflation direction along the second window side according to the inflation of the curtain without any interfering with the support portion. Accordingly, the forward movement of the tip of the side portion of the curtain can be properly conveyed to the band at the curtain inflation, and thereby the engagement of the engagement portion with the support portion can be attained smoothly. Thus, the inflation of the curtain, provision of the tension line, and extension of the tether can be attained smoothly.

According to another embodiment of the present invention, a band is provided at a side portion of the curtain, a base-end portion of the band is connected to a fixed portion that is fixed at the periphery of the window portion or a portion near the fixed portion of the periphery of the window portion and a tip-end portion of the band is connected to the tip portion of the side portion of the curtain, the support portion is configured to be located between the side portion of the curtain and the band such that the tip end of the band is located on a side of the support portion that is opposite to the first window side in the folded state of the curtain and a middle portion of the band as the engagement portion is moved toward the support portion so as to engage with the support portion according to the inflation of the curtain.

Thereby, the tip-end portion of the band is moved forward in the inflation direction along the second window side according to the inflation of the curtain without any interfering with the support portion. Accordingly, the forward movement of the tip of the side portion of the curtain can be properly conveyed to the band at the curtain inflation, and thereby the engagement of the engagement portion with the support portion can be attained smoothly. Thus, the inflation of the curtain, provision of the tension line, and extension of the tether can be attained smoothly.

According to another embodiment of the present invention, the curtain is configured to cover the window portion of a vehicle, and the gas supply device is operative to supply the gas to the inflatable portion of the curtain at least when a crash of the vehicle is predicted, the crash of the vehicle is detected, or a rollover the vehicle is determined.

Thereby, even in an emergency, such as a vehicle crash or a vehicle rollover, the curtain can be inflated promptly, thereby protecting the passenger properly.

According to another embodiment of the present invention, the inflatable portion of the curtain is provided near the engagement portion.

Thereby, since the movement of the curtain inflation is conveyed to the engagement portion promptly and surely, the movement and engagement of the engagement portion with the support portion can be attained smoothly.

According to another embodiment of the present invention, the curtain is configured to be inflated in such a manner that the tip portion moves beyond an edge of the window portion.

Thereby, since the entire area of the window portion can be covered surely by the curtain and the curtain can be support at the periphery of the window portion, the protection of passengers or objects can be improved.

According to another embodiment of the present invention, an angle formed between the first window side and the second window side is approximately 130 degrees or less, and the curtain is configured to be accommodated at the first window side and the second window side of the window portion.

In a case where the angle formed between the first window side and the second window side is relatively small within a range of 90 to 130 degrees, a length of the curtain located from the first window side to the second window side, or a length of the curtain located along the first, second and third window sides become relatively long. Accordingly, the tether described above can function properly for preventing an inboard or outboard movement of the curtain in this case.

According to another embodiment of the present invention, the other end of the tether is connected to a specified portion of the first window side, which is located on a side that is away from the first window side relative to a center of the first window side, or a specified portion of a third window side that is provided next to the first window side on an opposite side to the second window side, or a peripheral portion of the curtain that is restrained by the specified portion of the first window side or third window side when the curtain is in the inflated state.

Thereby, since the tether extends across near the center of the window portion, the protection of passengers or objects inside vehicles or structures can be attained surely. Further, the uncovered area can be properly generated.

According to another embodiment of the present invention, the curtain is configured to cover the window portion of a side window of a vehicle, and the tether is configured to extend longitudinally at a specified level that is higher than a belt line of the vehicle and lower than an upper end of a headrest of a vehicle seat.

Thereby, since the extending tether is positioned across the passenger seated in the seat at the inflation of the curtain, the protection of the passenger can be improved. Further, the uncovered area can be properly generated.

According to another embodiment of the present invention, a length of the band from a point of the support portion to a point connecting to the tip portion of the side portion of the curtain at the inflation of the curtain is configured to be a half or more of a length of the side portion of the curtain from the fixed portion to a tip end of the curtain.

Thereby, the length of the band from the point of the support portion to the point connecting to the tip portion of the side portion of the curtain is sufficiently long. Accordingly, in a case where the curtain is turned up for allowing passengers or objects to get out of vehicles or structures easily before the curtain shrinks after the inflation, the band may not prevent the curtain from being turned up.

Namely, when it is needed for passengers or objects to get out of vehicles or structures, the curtain may be turned up around the fixed portion of the curtain. Herein, if the above length of the band was short, a distance of the tip portion of the curtain that could be away from the window portion, or a distance of the tip portion of the curtain that could be moved toward the first window side would be too short. Accordingly, the curtain would not be turned up widely.

According to the above embodiment, however, the above length of the band becomes sufficiently long. Thereby, the curtain can be turned up widely, which can make it easy for passengers or objects to get out of vehicles or structures.

According to another embodiment of the present invention, the fixed portion of the side portion of the curtain is fixed to the first window side or a border of the first window side with the second window side.

Thereby, a larger space can be generated between the window portion and the curtain by tuning up the curtain, which can make it easy for passengers or objects to get out of vehicles or structures.

Other features, aspects, and advantages of the present invention will become apparent from the following description which refers to the accompanying drawings.

BRIEF DESCRIPTION OF THE DRAWINGS

FIG. 1A is an elevation view, when viewed from a cabin side, of a curtain airbag device with a curtain in an inflated state according to an embodiment 1 of the present invention, and FIG. 1B is a schematic plan view thereof.

DETAILED DESCRIPTION OF THE INVENTION

Figure 2:
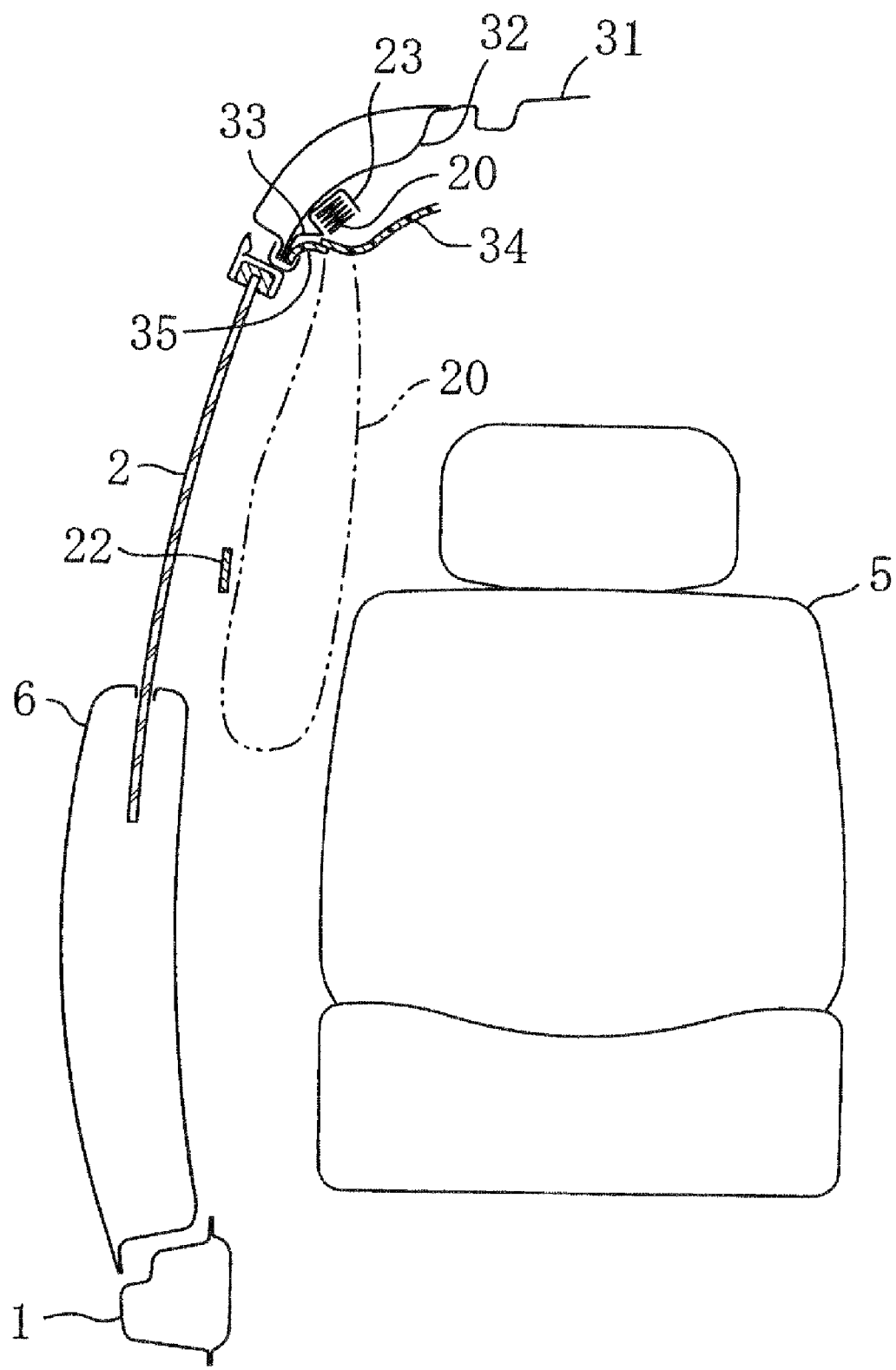
FIG. 2 is a schematic sectional view taken along line A-A of FIG. 1A.

Hereinafter, preferred embodiments of the present invention will be described referring to the accompanying drawings.

Embodiment 1

The present embodiment relates to a curtain airbag device of a side window portion of a vehicle (automotive vehicle) as shown in FIG. 1. Herein, respective reference numerals denote the following parts, that is, 1 denotes a vehicle body, 2 denotes a first window (wind shield) provided at a door beside a driver's seat 5, 3 denotes a second window (rear window) provided beside a front-row seat 7 behind the driver's seat 5, and 4 denotes a third window (quarter window) provided beside a rear-row seat 8. Also, 11 denotes a first pillar (front pillar) disposed at a front side of the door 6, 12 denotes a second pillar (front center pillar) at a rear side of the door 6, 13 denotes a third pillar (rear center pillar) provided between the second window 3 and the third window 4, and 14 denotes a fourth pillar (quarter pillar) at a rear side of the second window 4. Respective seatbelts 15 to protect passengers are provided at the seats 5, 7 and 8.

The above three windows 2-4 constitute a side window portion of the vehicle body 1 in the present embodiment. Namely, the side window portion comprises a first window side (upper window side) that is comprised of a roof-side periphery, a second window side (front window side) that is comprised of the first pillar 11, a third window side (rear window side) that is comprised of the fourth pillar 14, and a fourth window side that is comprised of the door 6 and a belt line of the vehicle body 1. This side window portion is formed in substantially a quadrilateral shape; more specifically it is formed in substantially a trapezoid shape with the first window side that is shorter than the fourth window side. An angle θ formed between the first window side and the third window side is set to be approximately 130 degrees or less.

Herein, the second window side is referred to as one of the window sides located at the front side and the third window side is referred to as another window side located at the rear side just for explanations.

There is provided a curtain airbag device that can cover the above side window portion. The curtain airbag device comprises a curtain 20 (curtain body) including an inflatable portion that can be inflated by supplied gas, an inflator 21 that is a gas supply device to supply the gas to the inflatable portion, a tether 22 formed in a tape shape, and bands 38, 39 formed in the tape shape.

The curtain 20 is folded in bellows shape and accommodated in a casing 23, along with the tether 22, at the side window portion from the first window side to upper portions of the second and third window sides. Herein, the curtain may be folded in a roll shape and accommodated likewise. The curtain 20 comprises an inflatable portion 24 that extends vertically along the second window side, an inflatable portion 25 that extends vertically along the third window side and is located beside a seatback of the rear-row seat 8 to protect a head of the passenger in the seat, and two central inflatable portions 26, 26 that extend vertically and are located beside seatbacks of the driver's seat 5 and the front-row seat 7 to protect heads of the passengers in the seats. These inflatable portions 24-26 are connected to each other via an upper inflatable portion that extends longitudinally at an upper portion of the curtain. Namely, these portions 24-26 diverge from the upper inflatable portion and extend downward, respectively. Adjacent inflatable portions are coupled via non-inflatable webs 27. The curtain 20 is configured to be inflated in such a manner that it covers almost an entire area of the side window portion and its tip portion moves beyond the fourth window side of the side window portion.

The inflator 21 operates at a specified state of the vehicle to supply gas to the upper inflatable portion of the curtain 20 via a pipe 28. The specified state of the vehicle is, for example, when the vehicle crash is predicted, the vehicle crash is detected, or a vehicle rollover is determined. There are provided sensors to detect these states and a controller that determine these states by receiving outputs of the sensors and operates the inflator 21.

The casing 23 having the folded curtain 20 accommodated therein, as shown in FIG. 2, is formed with a U-shaped cross section and supported via a bracket 33 at a roof rail 32 extending longitudinally along a side edge of a roof panel 31. The casing 23 is covered by a head lining 34 from inside. A side edge of the head lining 34 is detachably engaged with a side lining 35 so that it can be off from the side lining 35 with an inflation force of the curtain 20 to generate a gap with the side lining 35. Thereby, the curtain 20 is allowed to be inflated through the gap, which will be formed between the head lining 34 and the side lining 35, into a cabin of the vehicle. The side lining 35 is supported via a welt at the roof panel 31 along with the roof rail 32. In FIG. 2, the tether 22 is illustrated in its position in a state where the curtain 20 is inflated for convenience, not in state where the curtain 20 is accommodated in the casing 23.

Next, provision of a tension line and tether 22 will be described.

As shown in FIG. 1A, at both lower ends of the casing 23 extending downward along the second and third window sides are provided a second-window-side support pin 36 and a third-window-side support pin 37 as a support portion. Namely, these support pins 36, 37 are respectively disposed at a portion of the second window side that is away from the first window side and a portion of the third window side that is away from the first window side. Meanwhile, at the both sides of the curtain 20 (the second window side and the third window side) are provided bands 38, 39 operative to provide a weak tension line at the curtain 20 in cooperation with the support pins 36, 37.

A base-end portion of the curtain 20 is held at the casing 23 along the window side from the second window side to the first and third window sides. Portions of the casing 23, which is shown with a mark x in FIG. 1A, are fixed points 10 that fix the base-end portions of the curtain. The curtain is accommodated in the casing 23 at a side of the first window side relative to the support pins 36, 37. Further, a range E shows an accommodation area of the tether 22 in the casing 23. The tether 22 is basically accommodated in the casing 23 in its extended state (herein, there may be provided a partial slack at the tether).

Figure 3:
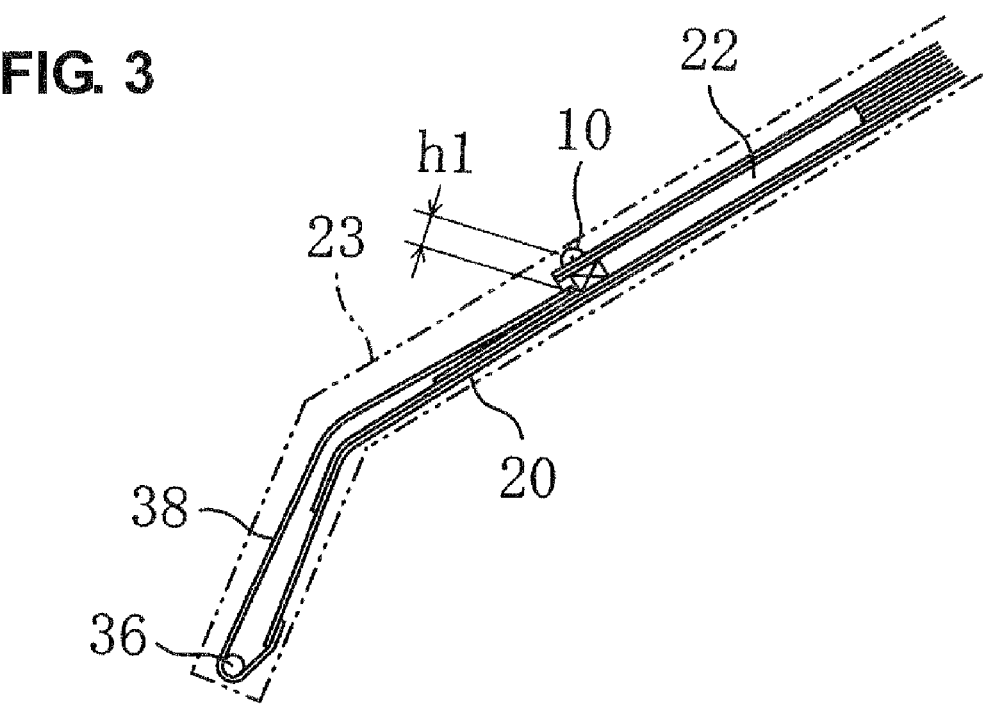
FIG. 3 is an elevation view showing the curtain in a folded state of the embodiment 1, which is located at a second window side (showing the curtain in an enlarged scale compared to the curtain in an inflated state shown in FIG. 4).
Figure 4:
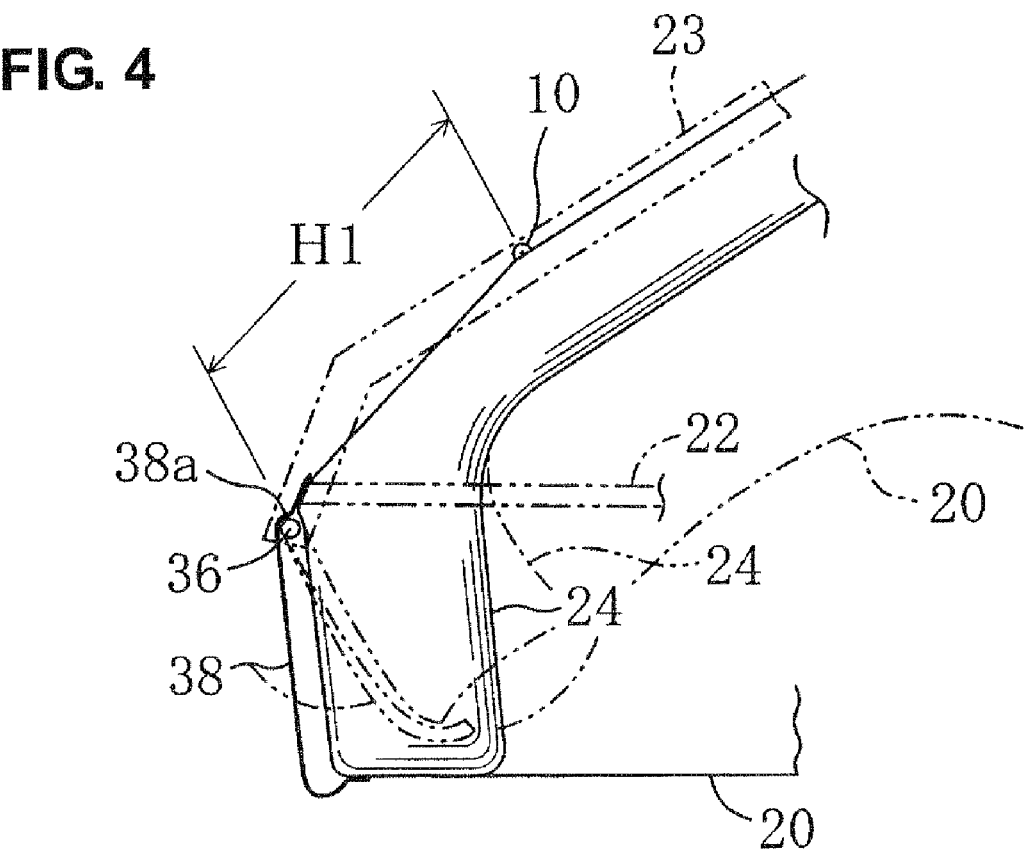
FIG. 4 is an elevation view showing the curtain in the inflated state of the embodiment 1, which is located at the second window side.
Figure 5:
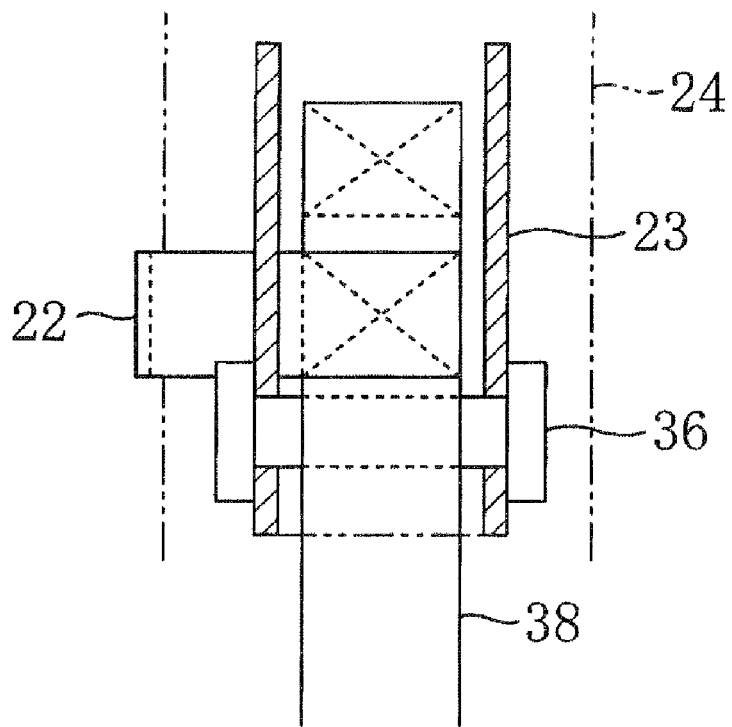
FIG. 5 is a sectional view of a support pin of the embodiment 1.

FIG. 3 shows the folded state of the curtain 20 and the tether 22 that are accommodated in the casing 23 at the second window side, and FIG. 4 shows the inflation state of the curtain. Although FIG. 3 shows the tether 22 to be located on a near side of the curtain 20 in order to provide an easy understanding of the accommodation state of the tether 22 in FIG. 3, the tether 22 is accommodated in back of the curtain 20 (i.e., on an outboard side). As shown in FIG. 4, a base-end portion of the band 38 at the second window side is connected to a middle portion of a side face of the second-window-side inflatable portion 24 of the curtain 20 and its tip-end portion is connected to a tip end of the second-window-side inflatable portion 24 of the curtain 20. The second-window-side support pin 36, as shown in FIG. 5, is provided to be supported by both side walls of the casing 23 and disposed substantially perpendicularly to a window face in such a manner that it is located between the side face of the inflatable portion 24 and the band 38. In the folded state of the curtain 20, as shown in FIG. 3, the band 38 is accommodated in the casing 23 along the second-window-side inflatable portion 24 in such a manner that its tip-end portion is located on a lower face (a face opposite to the first window side) of the support pin 36, like being wound up around the lower face, and its base-end portion is located on a side of the first window side relative to the support pin 36.

Accordingly, as the second-window-side inflatable portion 24 is inflated by the gas supply and its tip portion moves toward the fourth window side, the tip end of the band 38 also moves toward the fourth window side and then the base-end portion of the band 38 engages with the second-window-side support pin 36. Thereby, the inflated curtain 20 is restrained not only at its base-end portion by the casing 23, but at its side portion on the second window side by the support pin 36. Herein, the base-end portion of the band 38 constitutes an engagement portion 38a operative to engage with the support pin 36.

Herein, as shown in FIG. 3, a curtain length h1 from the fixed point 10 that is the closest to the support pin 36 at the base end of the side portion of the curtain 20 to the connecting point of the band 38 (namely, a length of the folded curtain in a state in which the curtain 20 is inflated) is set to be a length H1 (or longer) from the fixed point 10 to the support pin 36. A length of the band 38 is set to be a length of a corresponding part of the curtain 20 in the inflated state from the support pin 36 to the tip portion of the curtain side portion.

Figure 6:
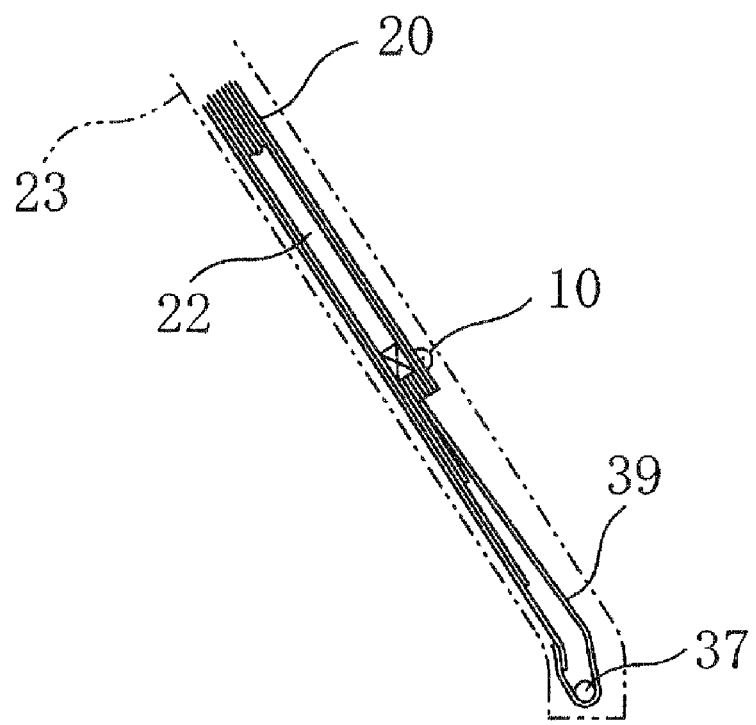
FIG. 6 is an elevation view showing the curtain in a folded state of the embodiment 1, which is located at a third window side (showing the curtain in an enlarged scale compared to the curtain in an inflated state shown in FIG. 7).
Figure 7:
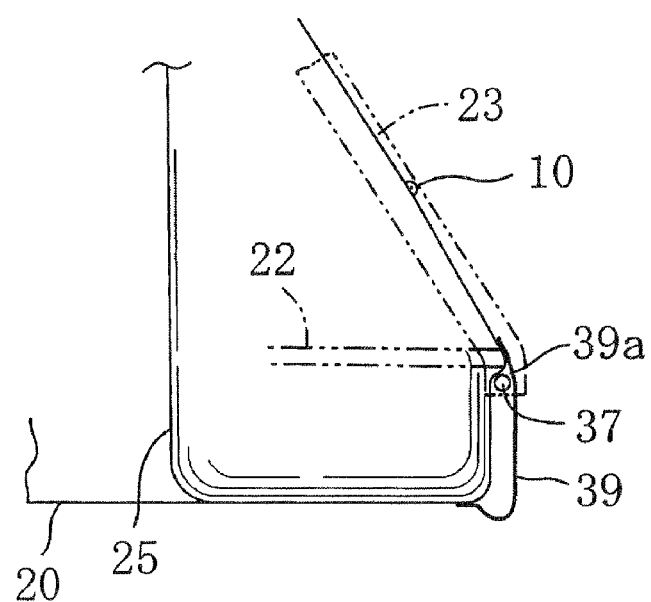
FIG. 7 is an elevation view showing the curtain in the inflated state of the embodiment 1, which is located at the third window side.

The band 39 provided at the third window side has a similar structure to the second-window-side band 38 as shown in FIGS. 6 and 7. Namely, a base-end portion of the band 39 is connected to a middle portion of the side face (rear side face) of the third-window-side inflatable portion 25 and a tip-end portion of the band 39 is connected to a portion near the tip portion of the inflatable portion 25. The third-window-side support pin 37, like the second-window-side support pin 36, is supported at the casing 23 and disposed substantially perpendicularly to the window face in such a manner that it is located between the side face of the inflatable portion 25 and the band 39. In the folded state of the curtain 20, as shown in FIG. 6, the band 39 is accommodated in the casing 23 along the third-window-side inflatable portion 25 in such a manner that its tip-end portion is located on a lower face (a face opposite to the first window side) of the support pin 37, like being wound up around the lower face, and its base-end portion is located on a side of the first window side relative to the support pin 37.

Accordingly, as the third-window-side inflatable portion 25 is inflated by the gas supply and its tip portion moves toward the fourth window side, the tip end of the band 39 also moves toward the fourth window side and then the base-end portion of the band 39 engages with the third-window-side support pin 37 (FIG. 7). Thereby, the inflated curtain 20 is restrained not only at its base-end portion by the casing 23, but at its side portion on the third window side by the support pin 37. Herein, the base-end portion of the band 39 constitutes an engagement portion 39a operative to engage with the support pin 39.

Thus, by the above-described engagement of the bands 38, 39 with the support pins 36, 37 and the restraint of the curtain 20 by the support pins 36, 37, there can be provided a tension provision portion comprised of the both support pins 36, 37 that provides the weak tension at the curtain 20. In the present embodiment, since the both side portions of the curtain 20 are directly restrained by the support pins 36, 37, a straight line connecting the both support pins 36, 37 constitutes a tension line 40 of the curtain 20 as shown in FIG. 1A. Thereby, even if an outer force was applied to the curtain 20 on this tension line 40, the curtain would not be moved inappropriately. Thus, since the tension line can be provided at the curtain 20 at a location that is away from the base end portion of the curtain 20 held at the casing 23, passengers can be prevented from getting out of the windows 2-4 improperly. Herein, although the present invention may not necessarily require the curtain 20 itself to have a tension line, the curtain 20 could get a desirably strong tension by properly adjusting the length of the curtain cloth (the length of the curtain 20 without the inflation of the inflatable portions 24-26). Also, the tension line may be provided only with the tether 22, which will be described below.

Figure 8A:
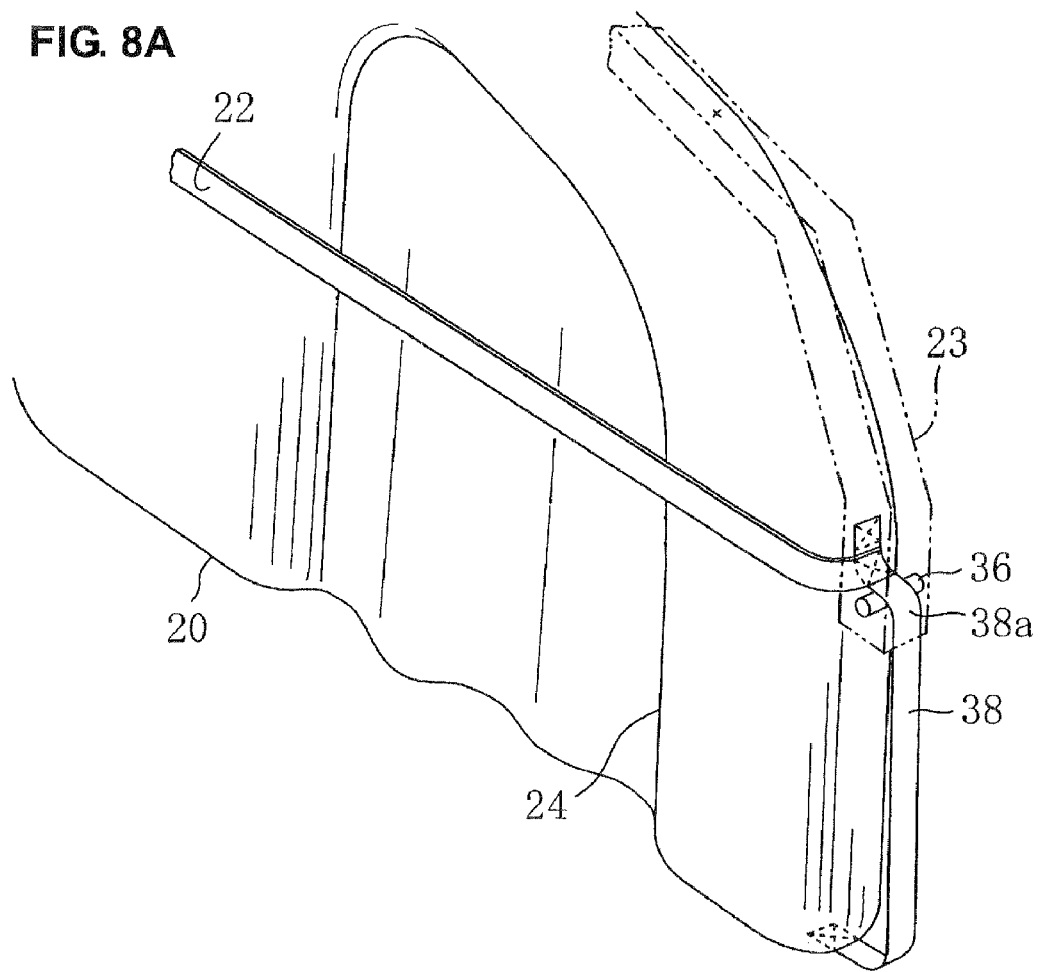
FIG. 8A is a perspective view, when viewed from a vehicle outside, of the curtain of the embodiment 1, which is located at the second window side.
Figure 9:
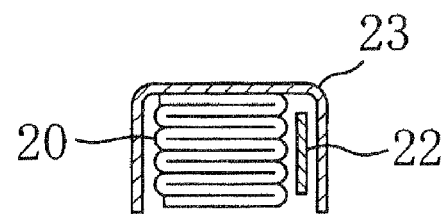
FIG. 9 is a cross-sectional view of the casing accommodating the tether in accordance with the present invention.

The tether 22 is provided, as shown in FIG. 8A, such that its one end is connected to the base-end portion of the band 38 and the other end is connected to the base end portion of the band 39. This tether 22 is accommodated in the casing 23 beside the folded curtain 20 (on the outboard side) as shown in FIG. 9. Accordingly, both ends of the tether 22 move toward the fourth window side along with the base-end portions of the bands 38, 39 according to the inflation of the curtain 20, and the tether 22 comes to be positioned beside and outside the inflatable portions 24-26 of the curtain 20 across the side window portion. Namely, the tether 22 is provided so as to extend longitudinally along the above tension line 40. Thereby, the tether 22 can become a backup for the curtain 20. The tether 22 extending longitudinally is positioned at a level that is higher than a beltline of the vehicle body 1 and lower than upper ends of headrests of the seats 5, 7, 8. Thereby, the protection of the passengers 9 can be improved.

As shown schematically in FIG. 1B, the length of the tether 22 extending across the window portion is shorter than a length of its corresponding part of the curtain 20 in a state in which the curtain 20 is inflated without the inflation of the inflatable portions 24-26, i.e., a length at the tension line 40 (a length of the curtain cloth constituting an inboard face of the curtain 20 or a length of the curtain cloth constituting an outboard face of the curtain 20, which is shorter). Thereby, the tether 22 can provide a greater (stronger) tension than the curtain 20, so the movement of the curtain 20 can be surely suppressed by the tether 22. Although the tether 22 extends straight connecting portions near the both support pins 36, 37 in FIG. 1B, the tension may not need to be so strong, as long as the tether 22 could suppress the outward movement of the curtain 20 effectively.

Accordingly, even when as the time lapses, the gas goes out of the inflatable portions 24-26 and thereby these portions 24-26 come to shrink, the tether 22 can be backup for the curtain 20 and thereby the protection of the passengers can be maintained properly.

Also, since it is accommodated beside the folded curtain 20 in the casing 23, the tether 22 can extend beside the inflatable portions 24-26, thereby preventing the inflation of the curtain 20.

Figure 8B:
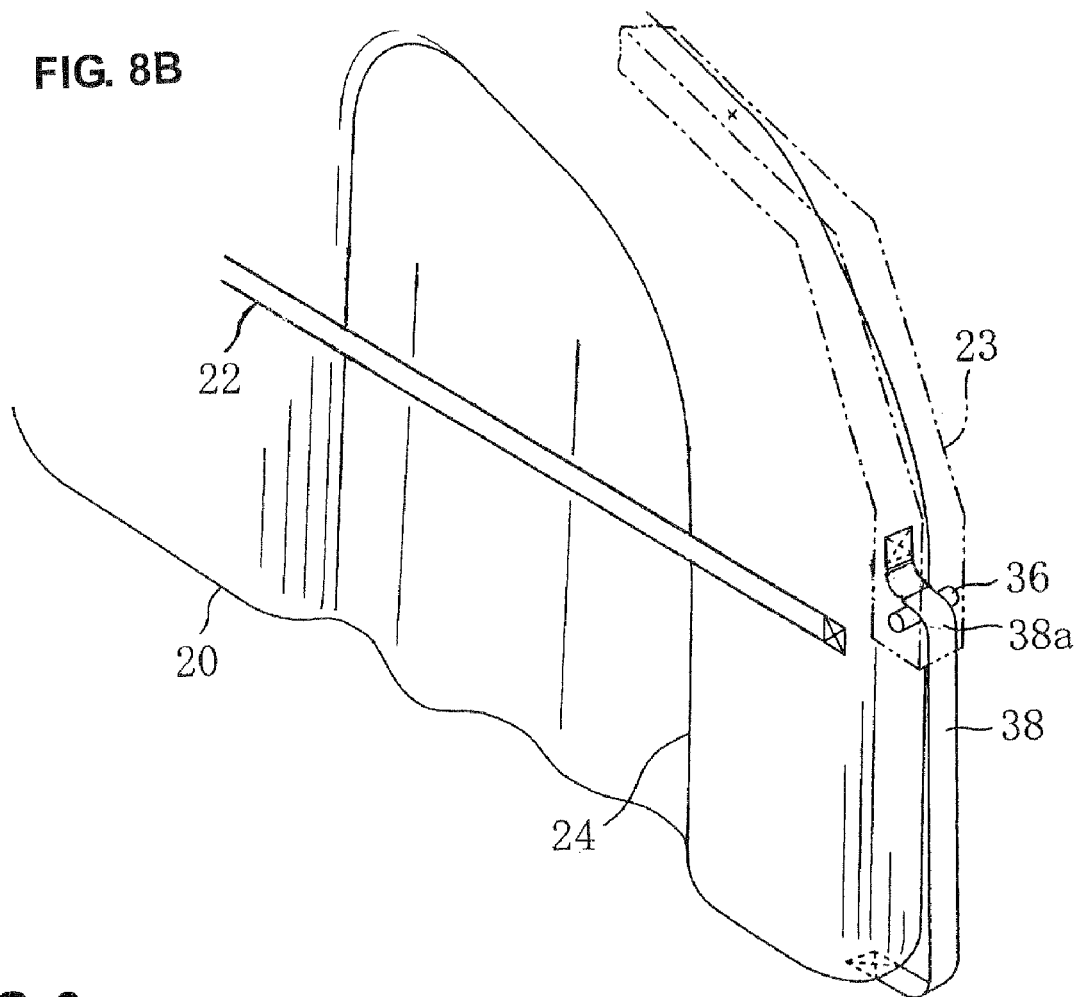
FIG. 8B is a perspective view, when viewed from a vehicle outside, of the curtain of an alternative embodiment, which is located at the second window side.

Herein, as shown in FIG. 8B with a two-dotted broken line, the tether 22 may be provided to interconnect respective portions near the engagement portions 38a, 39a of the inflatable portions 24, 25. Namely, the tether 22 can be provided to interconnect proper portions of the curtain 20, as long as the support pins 36, 37 related to the engagement portions 38a, 39a can support the tether sufficiently.

Also, the tension of the tether 22 can be made stronger than the tension of the curtain 20 near the tether by adjusting the length of the tether 22 to be shorter than the length of the curtain cloth constituting the inboard face of the curtain or the length of the curtain cloth constituting the outboard face of the curtain, which is shorter. In other words, the tension of the curtain itself can be weakened properly without deteriorating the protection by the curtain airbag. Thereby, the curtain can be smoothly moved inwardly (inboard) or outwardly (outboard) or bent along any longitudinally-extending line. Accordingly, the passengers can turn up the curtain at any locations easily (see the curtain illustrated with a two-dotted broken line in FIG. 4), which can make it easy for the passengers to get out of vehicles through a space generated between the tether 22 and the window peripheral portion.

Herein, although it is fixed to the casing 23 of the vehicle body 1 in the present embodiment, the base-end portion of the curtain 20 folded at the first window side may be fixed to the vehicle body 1 directly without providing the casing. This modification can be also applied in other embodiments as well.

Embodiment 2

Figure 10:
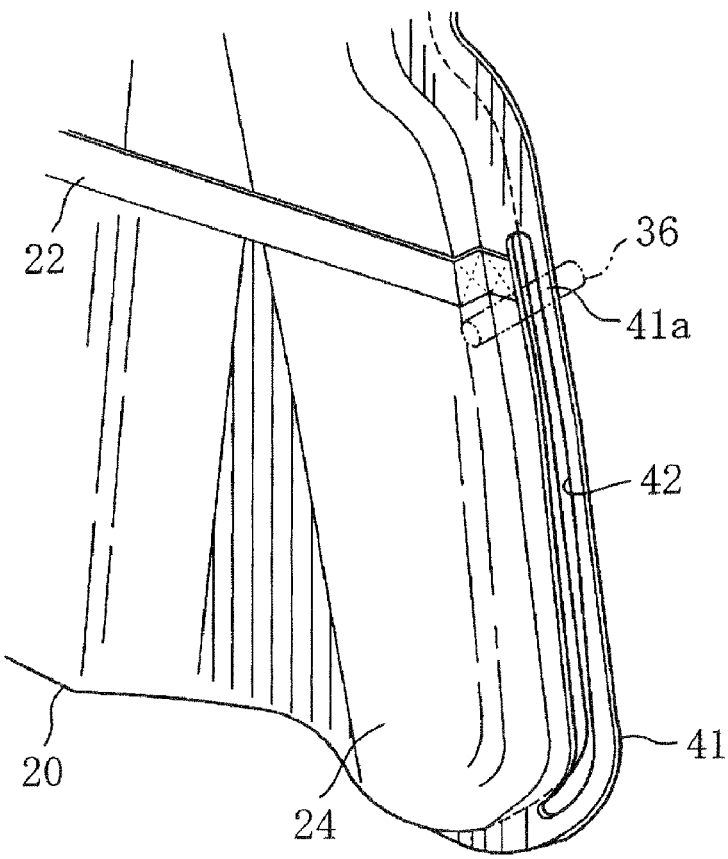
FIG. 10 is a view that is similar to FIG. 8A according to an embodiment 2 of the present invention.

A primary part of the present embodiment is shown in FIG. 10. Other parts are the same as the embodiment 1. In the present embodiment, a lobe portion 41 with a specified width is provided at the side portion of the curtain 20 along the second window side, instead of the band, and a slot (guide hole) 42 is formed at the lobe portion 41. This slot 42 is equivalent to the gap formed between the curtain 20 and the band in the embodiment 1. The supper pin 36 is provided so as to get through the slot 42 like the embodiment 1. The tether 22 is connected to the base-end portion (an end portion near the first window side) of the lobe portion 41. The side portion of the curtain 20 at the third window side is constituted like the portion at the above-described second window side.

Herein, the support pin 36 is configured to be located at a tip portion of the slot 42 (on the side of the fourth window side) when the curtain is in the folded state. Then, according to the inflation of the curtain 20, the tip portion of the slot 42 is moved toward the fourth window side, and the lobe portion 41 comes to engage with the support pin 36 at a base-end portion (engagement portion) 41a of the slot 42.

Accordingly, when the curtain 20 is in the folded state, a side portion of the curtain 20 that is located on the side of the fourth window side away from the portion held at the casing 23 is restrained by the support pin 36. Thereby, the tension line connecting the support pin 36 and the other support pin (not illustrated) is provided at the curtain 20 and the tether 22 is provided to extend along this tension line.

Embodiment 3

Figure 11:
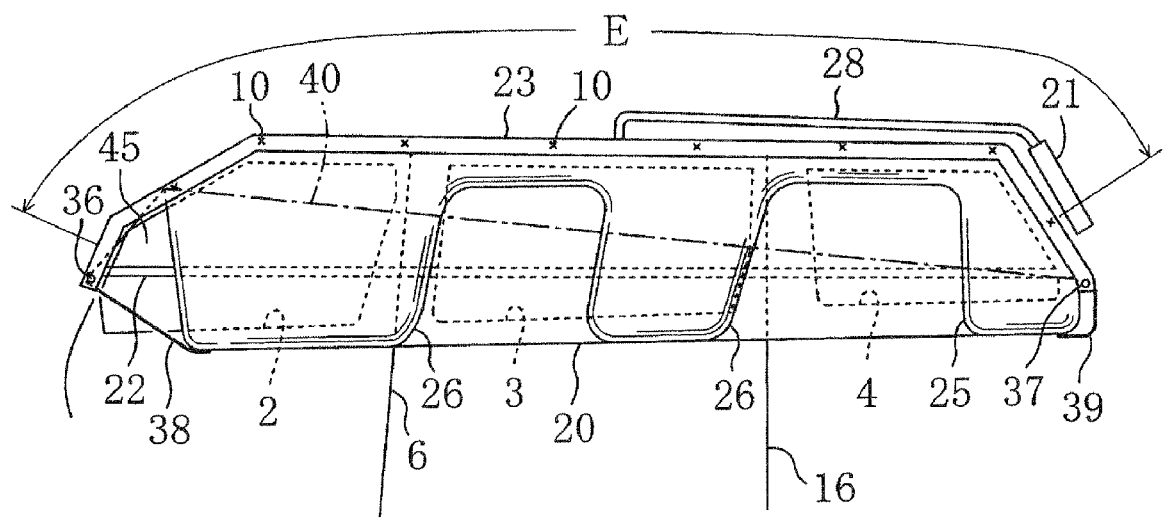
FIG. 11 is an elevation view, when viewed from the cabin side, of a curtain airbag device with a curtain in an inflated state according to an embodiment 3 of the present invention.
Figure 12:
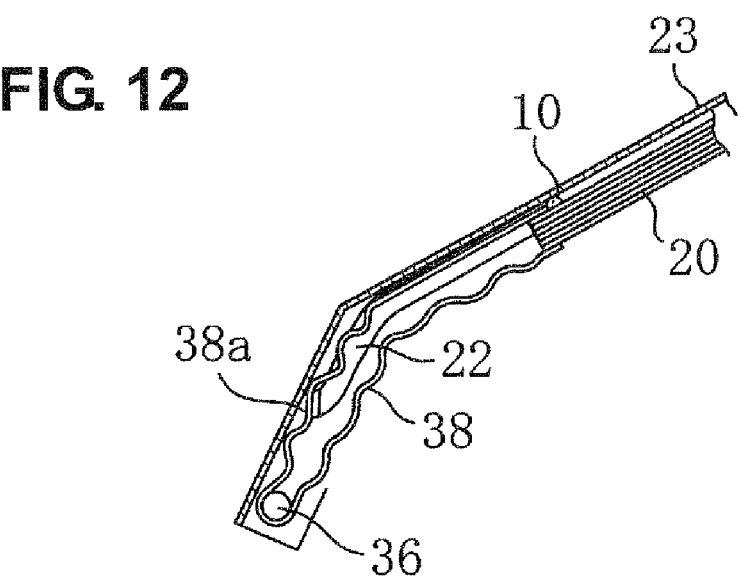
FIG. 12 is a sectional view showing the curtain in a folded state of the embodiment 3, which is located at the second window side.
Figure 13:
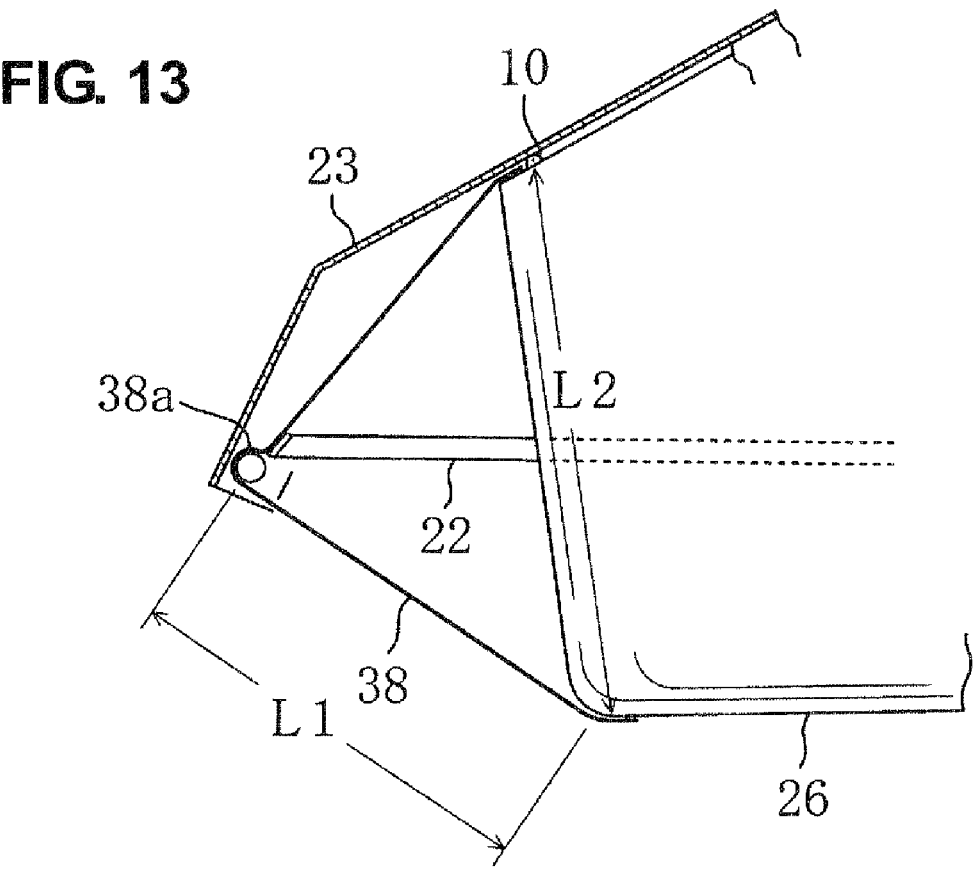
FIG. 13 is a sectional view showing the curtain in an inflated state of the embodiment 3, which is located at the second window side.

A primary part of the present embodiment is shown in FIGS. 11 through 13. Although the engagement portion of the curtain 20 that engages with the support pin 36 is provided at the base-end portion of the band 38 in the embodiment 1, the band 38 of the present embodiment is configured to be relatively long and the engagement portion 38a is configured to be located at the middle portion of the band 38 as shown in FIG. 11. Thereby, according to the inflation of the curtain 20, the side portion of the curtain moves away from the support pin 36 toward the center of the window portion, thereby generating an uncovered area 45 (space) between the second window side of the window portion and the curtain 20 (curtain body). Other basic parts are the same as the embodiment 1. A range E is an accommodation area of the tether 22.

Hereinafter, the present embodiment will be described more specifically. The front-side inflatable portion 26 is formed in an enlarged-width shape, unlike the embodiment 1, which extends vertically beside the seat back of the driver's seat. Herein, there is provided no independent side inflatable portion extending vertically along the second window side. The inflatable portion 26 beside the driver's seat constitutes the side inflatable portion. And, at the second window side of the window portion, the base-end portion of the band 38 is connected to a connecting portion of the base end of the curtain 20, e.g., the base end of the inflatable portion 26 (near the fixed point 10 that is the closest to the support pin 36) to the casing 23, and the tip-end portion of the band 38 is connected to the tip portion of the front-side inflatable portion of the curtain 20, e.g., the front tip end of the inflatable portion 26.

Herein, the base-end portion of the band 38 may be connected to the casing 23 or the window portion that is near the above fixed point.

When the curtain is folded and accommodated in the casing 23 as shown in FIG. 12, the band 38 is accommodated in the casing 23 in such a manner that a middle portion of the band 38 is wound up around the support pin 36 and the band 38 has loosened without a tension. The engagement portion 38a of the band 38 is located away from the support pin 36 toward the first window side, and one end of the tether 22 is connected to the engagement portion 38a (part of the tether 22 is not illustrated in the figure). Then, according to the inflation of the curtain 20, the tip portion of the inflatable portion 26 of the curtain 20 is moved toward the fourth window side and thereby the engagement portion 38a of the band 38 is moved to the support pin 36.

Thereby, the engagement portion 38a of the band 38 comes to engage with the support pin 36, in which the band 38 is bent in a L shape, when viewed from the vehicle side, with its both ends constituting support points as shown in FIG. 13. Meanwhile, the tether 22 is provided to extend rearward from a location of the support pin 36 with a tension. At the third window side, the base-end portion of the band 39 is provided to engage with the support pin 37 like the embodiment 1.

In the present embodiment, as shown in FIG. 13, a length L1 of the band 38 from the support pin 36 to the connecting point to the tip portion of the curtain 20 when the curtain is inflated is set be a half of a length L2 of the curtain 20 from the fixed point 10 to the tip portion of the curtain 20 or longer.

Accordingly, by adjusting the length of the curtain cloth along the tension line properly, there can be provided the tension line 40 that interconnects the base end of the inflatable portion 26 supported at the casing 23 and the support pin 37 located at the third window side. The tether 22 can be the backup for the curtain 20 like the embodiment 1.

Further, according to the present embodiment, since the above length L1 of the band 38 is set to be a half of the above length L2 or longer, the band 38 may not prevent the curtain 30 from being turned up in a case where the curtain 20 is turned up for allowing passengers or objects to get out of vehicles before the inflatable portion 26 shrinks after the inflation.

Namely, since the above length L1 of the band 38 is set to be sufficiently long, the inflatable portion 26 of the curtain 20 can be turned up around the fixed point 10 widely so that the tip portion of the curtain 20 can be sufficiently away from the window portion to the first window side. Thereby, the curtain 20 can be turned up widely, which can make it easy for passengers or objects to get out of vehicles.

The windows 2, 3 of the front door 6 and the side door 16 are generally configured to open widely. And, passengers may escape through the windows 2, 3 (by lowering window panes) in an emergency. Herein, according to the present embodiment, since the front portion of the curtain 20 corresponding to the windows 2, 3 is easily turned up, the above escape of passengers can be properly attained. Further, since there is provided the uncovered area 45 between the front-side inflatable portion 26 of the inflated curtain 20 and the second window side of the window portion, the wide space for escape can be generated when the curtain 20 is turned up. Further, this uncovered area 45 could be an appropriate target for passengers looking for the escape area.

Also, like the embodiment 1, the tension of the curtain 20 near the tether can be made weak by adjusting the length of the tether 22 to be shorter than the length of the curtain cloth constituting the inboard face of the curtain or the length of the curtain cloth constituting the outboard face of the curtain, which is shorter, or by adjusting the length of the lower end (lower window side) of the curtain 20 to be relatively long. Accordingly, it can be easy for the passengers to get out of vehicles.

Herein, it is supported at the casing 23 at the second window side of the window portion in the present embodiment, the front end of the base-end portion of the curtain may be supported at the casing 23 at the first window side. Thereby, it can be easy for the passengers to get out of vehicles. Likewise, the rear end of the base-end portion of the curtain may be supported at the casing 23 at the first window side, which can provide the same effects.

Herein, it is preferable for generating the uncover area that the angle formed between the first window side and the second window side be 90 degrees or more and 180 degrees or less.

Embodiment 4

Figure 14:
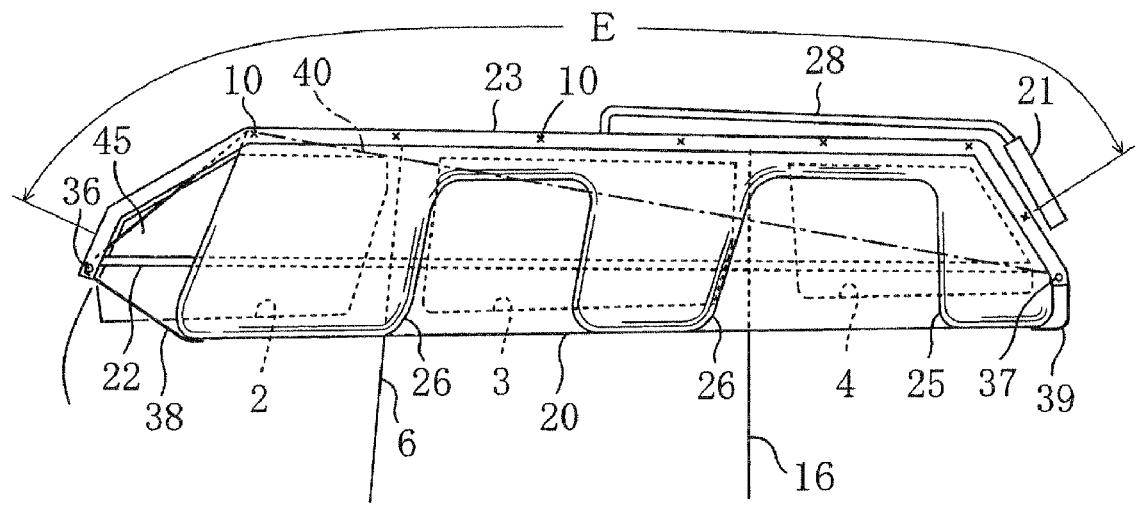
FIG. 14 is an elevation view, when viewed from the cabin side, of a curtain airbag device with a curtain in an inflated state according to an embodiment 4 of the present invention.
Figure 15:
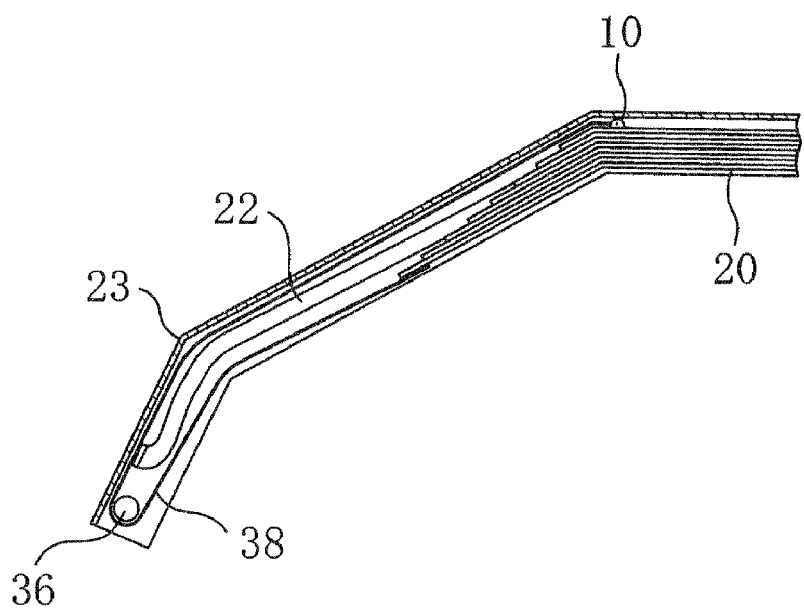
FIG. 15 is a sectional view showing the curtain in a folded state of the embodiment 4, which is located at the second window side.
Figure 16:
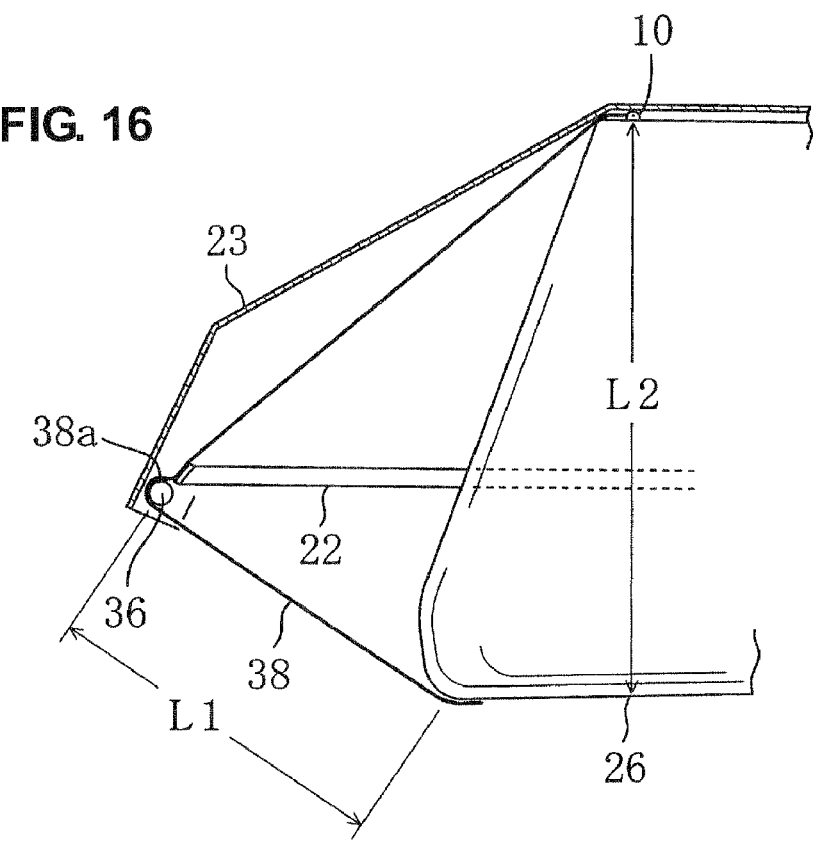
FIG. 16 is a sectional view showing the curtain in an inflated state of the embodiment 4, which is located at the second window side.

FIGS. 14 through 16 show primary parts of the present embodiment. A distinction from the embodiment 3 is that the base-end portion of the side portion of the curtain 20 at the second window side is fixed to a border of the first window side with the second window side of the periphery of the window portion, thereby generating the wide uncovered area 45 between the curtain 20 and the second window side. The range E in FIG. 14 shows the accommodation area of the tether 22. As shown in FIG. 16, the length L1 of the band 38 from the support pin 36 to the connecting point to the front-side tip portion of the curtain 20 when the curtain is inflated is set be a half of the length L2 of the curtain 20 from the fixed point 10 to the tip portion of the curtain 20 or longer.

Accordingly, the same effects as the embodiment 3 can be provided. In particular, since the wide uncovered area 45 is generated between the curtain 20 and the second window side by fixing the base-end portion of the side portion of the curtain 20 to the border of the first window side with the second window side, the curtain can be turned up widely, thereby making it easy for passengers or objects to get out of vehicles.

Embodiment 5

Figure 17:
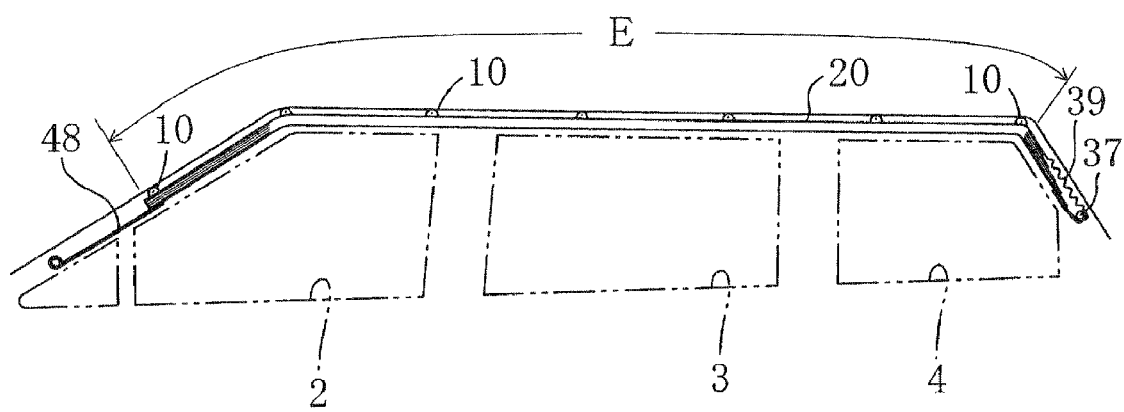
FIG. 17 is an elevation view, when viewed from the vehicle outside, of a curtain airbag device with a curtain in a folded state according to an embodiment 5 of the present invention.
Figure 18A:
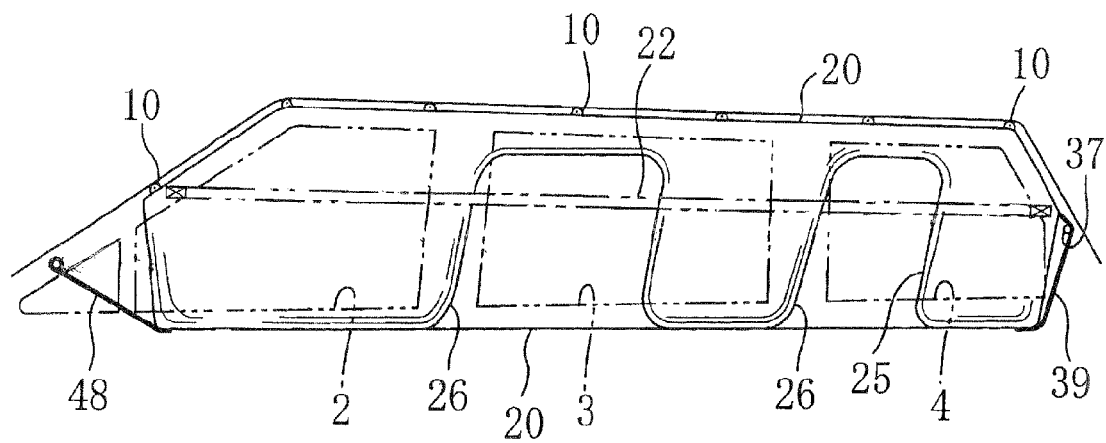
FIG. 18A is an elevation view, when viewed from the vehicle outside, of the curtain airbag device with the curtain in an inflated state of the embodiment 5.
Figure 18B:
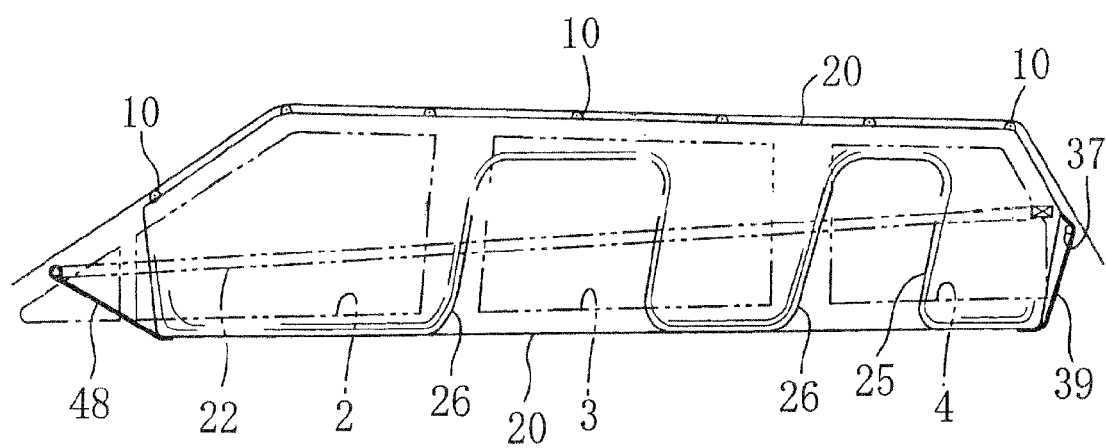
FIG. 18B is an elevation view, when viewed from the vehicle outside, of the curtain airbag device with the curtain in an inflated state of an alternative embodiment.
Figure 19:
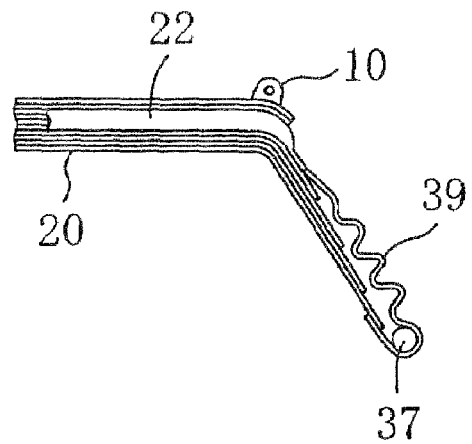
FIG. 19 is a view showing the curtain in the folded state of the embodiment 5, which is located at the third window side.

FIGS. 17 through 19 show primary parts of the present embodiment. The second window side of the window portion is straightly inclined. At the second window side, as shown in FIG. 17, the fixed point 10 of the base end of the side portion of the curtain 20 is located at the middle position of the second window side. The front end of the curtain 20 is fixed to the second window side via a fixing tether 48.

At the third window side, as shown in FIG. 19 as well, one end of the band 39 is connected to the middle portion of the side portion of the curtain 20 and the other end is connected to the tip portion of the side portion of the curtain 20, in which the end portion of the band 39 is wound up around the support pin 37, which is similar to the embodiment 1. Herein, the band 39 has loosened without a tension.

One end of the tether 22 is connected to a peripheral portion of the curtain 20 near the fixed point 10 at the second window side, and the other end of the tether 22 is connected to the middle portion of the curtain at the third window side (to the portion which the base-end portion of the band 39 is connected). The range E in FIG. 14 shows the accommodation area of the tether 22 in FIG. 17. The other end of the tether 22 may be connected to a portion near the fixed portion of the fixing tether 48 at the second window side, or to the fixing tether 48 as shown in two-dotted broken lines in FIG. 18B.

Accordingly, when the curtain 20 is inflated, the curtain 20 is made extend with a certain tension by the band 38 at the second window side, and the base-end portion of the band 39 engages with the support pin 37, thereby restraining the curtain side portion by support pin 37 at the third window side. The tether 22 extends in a direction of connecting the fixed point 10 at the second window side and the support pin 37 at the third window side across the window portion.

Thereby, the tether 22 can be the backup for the protection by the curtain 20 in the present embodiment as well, so the protection of the passengers can be attained surely. Also, since the band 39 has loosened without a tension at the third window side in the folded state of the curtain, the length of the extending curtain 20 from the support pin 37 can be made properly long even if the support pin 37 is located near the first window side. Thus, providing the curtain 20 extending beyond the fourth window side can be properly attained. Likewise, the escape area can be generated by turning up the curtain 20 after the inflation of the curtain 20.

Embodiment 6

Figure 20:
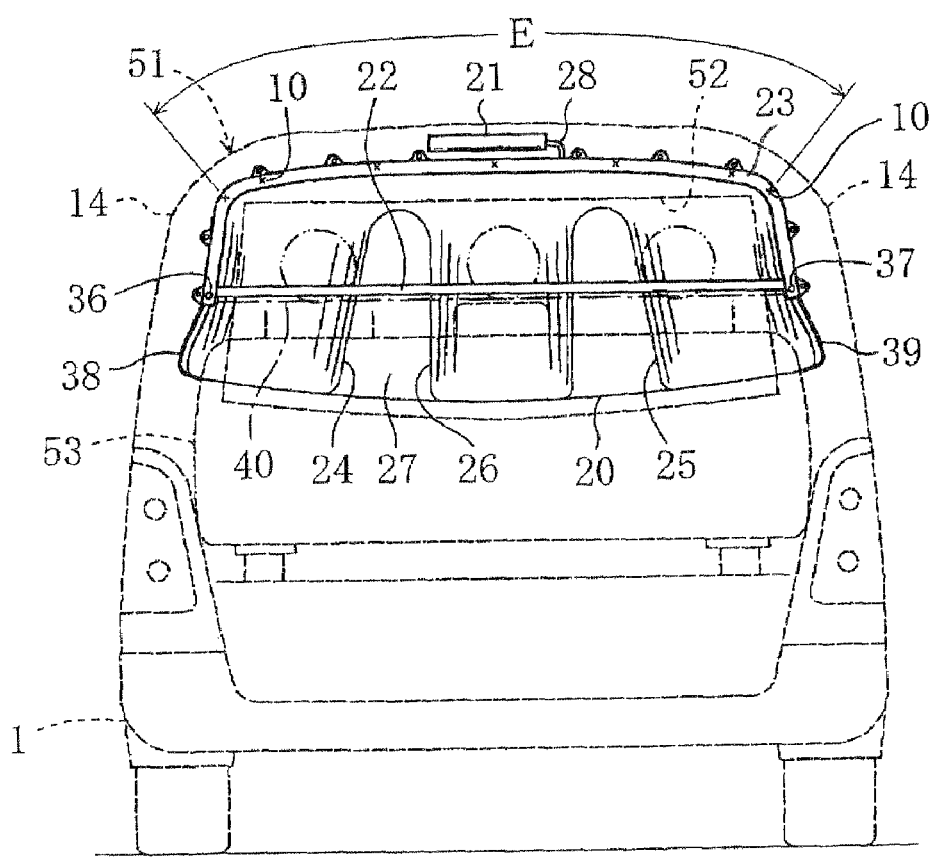
FIG. 20 is an elevation view, when viewed from the vehicle outside, of a curtain airbag device with a curtain in an inflated state according to an embodiment 6 of the present invention.

The present embodiment, which is shown in FIG. 20, is an example in which the present invention is applied to a back window at a back door 51 of the vehicle. This back window portion 52 is formed in a quadrilateral shape, which comprises a first window side (upper window side) that is comprised of a roof-rear periphery of the vehicle 1, second and third window sides that are comprised of both fourth pillars 14, and a fourth window side that is comprised of a lower edge of the back window. The curtain airbag device is configured to cover the back window portion. The curtain airbag device includes the curtain 20, inflator 21 and tether 22 like the embodiment 1.

The curtain 20 is folded and accommodated in the casing 23 at an area from the first window side to upper portions of the second and third window sides of the back window portion. The curtain 20 comprises an inflatable portion 24 that extends vertically along the second window side, an inflatable portion 25 that extends vertically along the third window side and a central inflatable portion 26 that extends vertically at the center of the back window portion. These inflatable portions 24-26 are connected to each other via an upper inflatable portion that extends longitudinally at an upper portion of the curtain. Adjacent inflatable portions are coupled via non-inflatable webs 27. The curtain 20 is, as shown in FIG. 20, inflated so as to extend downward beyond an upper end of a seat back 53 of a rearmost seat near the back window portion. The curtain 20 may be configured in such a manner that its tip portion goes downward beyond the fourth window side of the back window portion.

The inflator 21, which is substantially the same as that of the embodiment 1, is coupled to the upper inflatable portion of the curtain 20 via a pipe 28. A controller operates the inflator 21 based on outputs of the above sensor to detect the specified state of the vehicle. The casing 23, which is substantially the same as that of the embodiment 1, is supported at the roof rail and covered by the head lining from inside, and inflated into the cabin, getting out of a gap that may be formed at the head lining by the inflation force of the curtain 20.

At both lower ends of the casing 23 extending downward along the second and third window sides are provided a second-window-side support pin 36 and a third-window-side support pin 37 as a support portion. Meanwhile, at the both sides of the curtain 20 (the second window side and the third window side) are provided bands 38, 39 operative to provide tension line at the curtain 20 in cooperation with the support pins 36, 37. A base-end portion of the curtain 20 is held at the casing 23 along the window side from the second window side to the first and third window sides. A reference numeral 10 denotes fixed points 10 that fix the base-end portions of the curtain to the casing 23. The support pins 36, 37 are located below the fixed points 10 at the second and third window sides.

The bands 38, 39 are respectively provided in such a manner that their base-end portions are connected to respective middle portions of the side faces of the inflatable portions 24, 25 at the second and third window sides of the curtain 20 and their tip-end portions are connected to respective tip portions of the inflatable portions 24, 25. The support pins 36, 37 are provided in the same way as those of the embodiment 1 so as to get through between the side faces of the inflatable portions 24, 25 and the bands 38, 39. In the folded state of the curtain 20, like the embodiment 1, the bands 38, 39 are accommodated in the casing 23 along the inflatable portions 24, 25 in such a manner that their tip-end portions are located on the lower faces of the support pins 36, 37 and their base-end portions are located on a side of the first window side relative to the support pins 36, 37.

Accordingly, like the embodiment 1, as the inflatable portions 24, 25 are inflated with the gas supply, the tip-end portions of the bands 38, 39 move toward the fourth window sides and their base-end portions come to engage with the support pins 36, 37. Thereby, the both side portions of the curtain 20 are restrained by the pins 36, 37, so the support pins 36, 37 constitute a tension applying portion that applies the tension to the curtain 20. Thus, the tension line 40 connecting the both support pins 36, 37 is provided at the curtain 20.

One end of the tether 22 is connected to the base-end portion of the second-window-side band 38 and the other end of the tether 22 is connected to the base-end portion of the third-window-side band 39, and the tether 22 is accommodated beside (on the outboard side) the curtain 20 in the casing 23 like the embodiment 1. In FIG. 20, a range E shows an accommodation area of the tether 22.

Accordingly, both ends of the tether 22 move toward the support pins 36, 37 along with the base-end portions of the bands 38, 39 according to the inflation of the curtain 20, and the tether 22 comes to be positioned beside and outside the inflatable portions 24-26 of the curtain 20 across the side window portion, namely, it comes to extend laterally along the tension line 40. A relationship between the length of the tether 22 extending across the window portion and the length of its corresponding portion of the curtain 20 is the same as that of the embodiment 1.

Accordingly, even when as the time lapses, the gas goes out of the inflatable portions 24-26 and thereby these portions 24-26 come to shrink, the tether 22 can be backup for the curtain 20 and thereby the protection of the passengers can be maintained properly.

Embodiment 7

Figure 21:
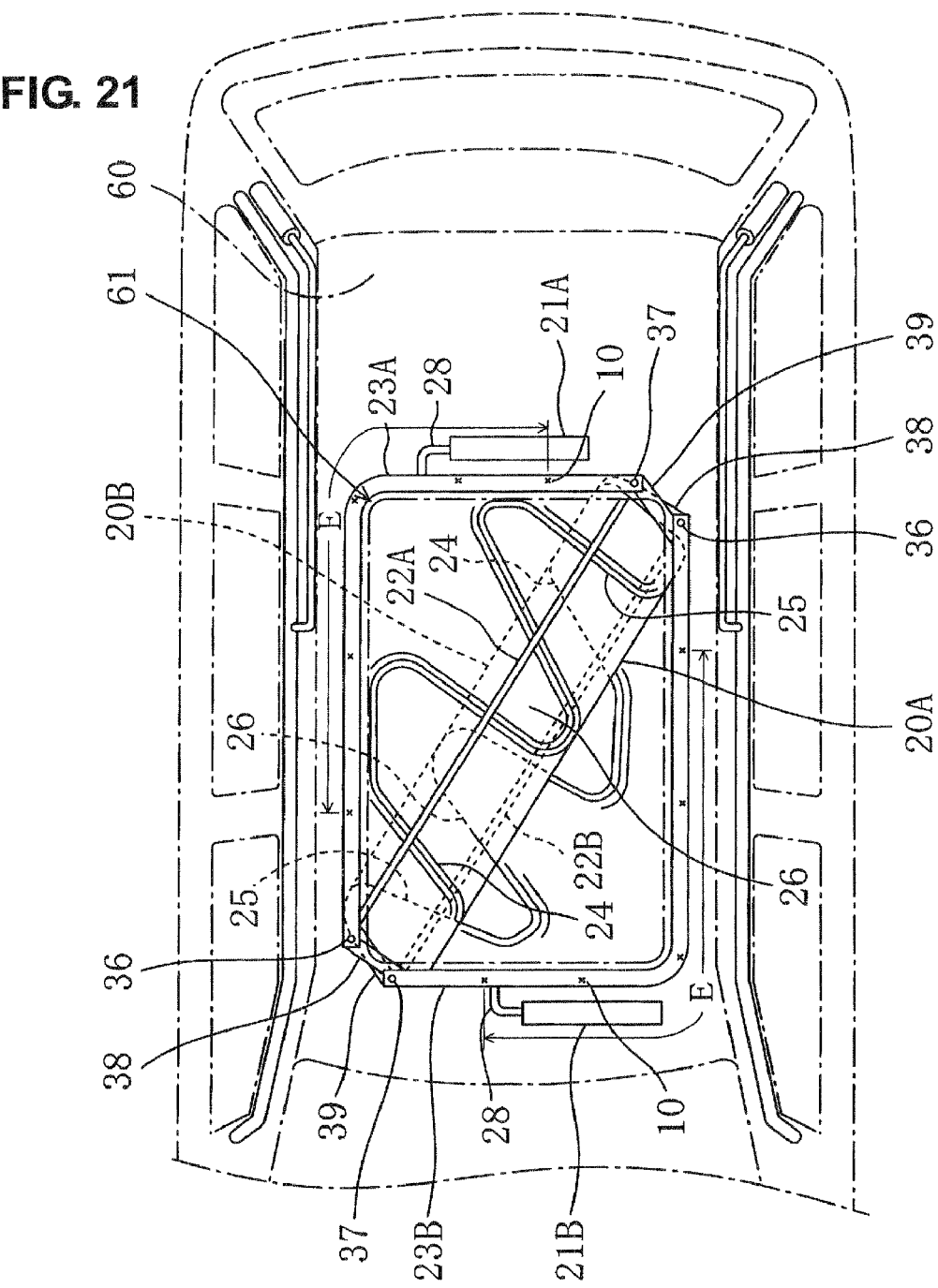
FIG. 21 is an elevation view, when viewed from the vehicle outside, of a curtain airbag device with a curtain in an inflated state according to an embodiment 7 of the present invention.
Figure 22:
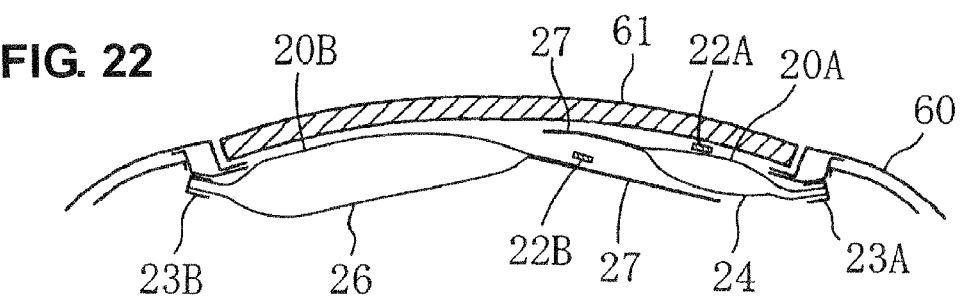
FIG. 22 is a sectional view showing the curtain in the inflated state of the embodiment 7.

The present embodiment, which is shown in FIGS. 21 and 22, is an example in which the present invention is applied to a roof window portion of the vehicle. Namely, at a roof 60 of the vehicle body 1 is provided a quadrilateral-shaped roof window 61, and a curtain airbag device is configured to cover the roof window portion.

The curtain airbag device comprises first and second curtains 20A, 20B with inflatable portions that are inflated by the gas supplied, inflators 21A, 21B as the gas supply device to supply the gas to the inflatable portions of the curtains 20A, 20B, and tethers 22A, 22B provided at the curtains 20A, 20B.

The first curtain 20A is folded and accommodated in a L-shaped casing 23A that is provided along the first and second window sides of the roof window portion, and the second curtain 20B is folded and accommodated in a L-shaped casing 23B that is provided along the third and fourth window sides of the roof window portion. Each of the curtains 20A, 20B has both-side inflatable portions 24, 25 and a central inflatable portion 26 that extend across a diagonal line connecting a corner between the first and fourth window sides and a corner between the second and third window sides. Adjacent inflatable portions are coupled via non-inflatable webs. The curtains 20A, 20B are inflated in such a manner that both tip ends lap over each other vertically. Herein, the respective central portions 26 of the curtains 20A, 20B are inflated so as to lap over the non-inflatable webs 27. Since the both-side inflatable portions 24, 25 of the curtains 20A, 20B lap over each other, their tip portions are configured to be relatively thin as shown in FIG. 22. The inflatable portions 24-26 of the curtains 20A, 20B are connected to each other.

The inflators 21A, 21B, which are substantially the same as that of the embodiment 1, are coupled to the inflatable portions 24-26 of the curtains 20A, 20B via respective pipes 28. The controller operates the inflators 21A, 21B based on outputs of the above sensor to detect the specified state of the vehicle. The casings 23A, 23B, which are substantially the same as that of the embodiment 1, are supported at the roof rail and covered by the head lining from inside, and inflated into the cabin, getting out of gaps that may be formed at the head lining by the inflation force of the curtains 20A, 20B.

At both ends of the casings 23A, 23B are provided support pins 36, 37 as a support portion. Meanwhile, at the both sides of the curtains 20A, 20B are provided bands 38, 39 operative to provide tension line at the curtains 20A, 20B in cooperation with the support pins 36, 37. A base-end portion of the curtain 20A is held at the casing 23A. A reference numeral 10 in FIG. 21 denotes fixed points 10 that fix the base-end portions of the curtains 20A, 20B to the casings 23A, 23B. The fixed points 10 at the both ends of the casing 23A are located at portions that are away from the support pins 36, 37 toward the corner between the first and second window sides. The fixed points 10 at the both ends of the casing 23B are also located at portions that are away from the support pins 36, 37 toward the corner between the third and forth window sides.

The bands 38, 39 are respectively provided in such a manner that their base-end portions are connected to respective middle portions of the side faces of the inflatable portions 24, 25 and their tip-end portions are connected to respective tip portions of the inflatable portions 24, 25. The support pins 36, 37 are supported at the casings 23A, 23B in perpendicular to the window pane so as to get through between the side faces of the inflatable portions 24, 25 and the bands 38, 39.

In the folded state of the curtain 20A, the bands 38, 39 are accommodated in the casing 23A along the inflatable portions 24, 25 in such a manner that their tip-end portions are located on the center of the casing 23A relative to the support pins 36, 37 and their base-end portions are located on a face of the support pins 36, 37 that is directed to the casing 23B. The bands 38, 39 on the side of the curtain 20B are also accommodated in the casing 23B along the inflatable portions 24, 25 in such a manner that their tip-end portions are located on the center of the casing 23B relative to the support pins 36, 37 and their base-end portions are located on a face of the support pins 36, 37 that is directed to the casing 23A.

Accordingly, as the inflatable portions 24, 25 of the curtains 20A, 20B are inflated with the gas supply, their tip portions move toward each other and the tip-end portions of the bands 38, 39 also move toward each other and their base-end portions come to engage with the support pins 36, 37. Thereby, the both side portions of the curtains 20A, 20B are restrained by the pins 36, 37, so the support pins 36, 37 constitute a tension applying portion that applies the tension to the curtains 20A, 20B. Thus, respective tension lines connecting the both support pins 36, 37 are provided at the curtains 20A, 20B.

Respective one ends of the tethers 22A, 22B are connected to the base-end portions of the band 38 and the other ends of the tethers 22A, 22B are connected to the base-end portions of the band 39. The tethers 22A, 22B are accommodated beside (on the outboard side) the curtains 20A, 20B in the casings 23A, 23B. In FIG. 21, a range E shows an accommodation area of the tethers 22A, 22B.

Accordingly, both ends of the tethers 22A, 22B move along with the base-end portions of the bands 38, 39 according to the inflation of the curtains 20A, 20B, and the tethers 22A, 22B come to be positioned beside and outside the inflatable portions 24-26 of the curtains 20A, 20B across the roof window portion, namely, they come to extend laterally along the tension line. A relationship between the length of the tethers 22A, 22B extending across the window portion and the length of its corresponding portion of the curtains 20A, 20B is the same as that of the embodiment 1.

Accordingly, even when as the time lapses, the gas goes out of the inflatable portions 24-26 and thereby these portions 24-26 come to shrink and the tension of the tension lines of the curtain 20A, 20B become weak, the tethers 22A, 22B can be backup for the curtains 20A, 20B and thereby the protection of the passengers can be maintained properly.

Embodiment 8

Figure 23:
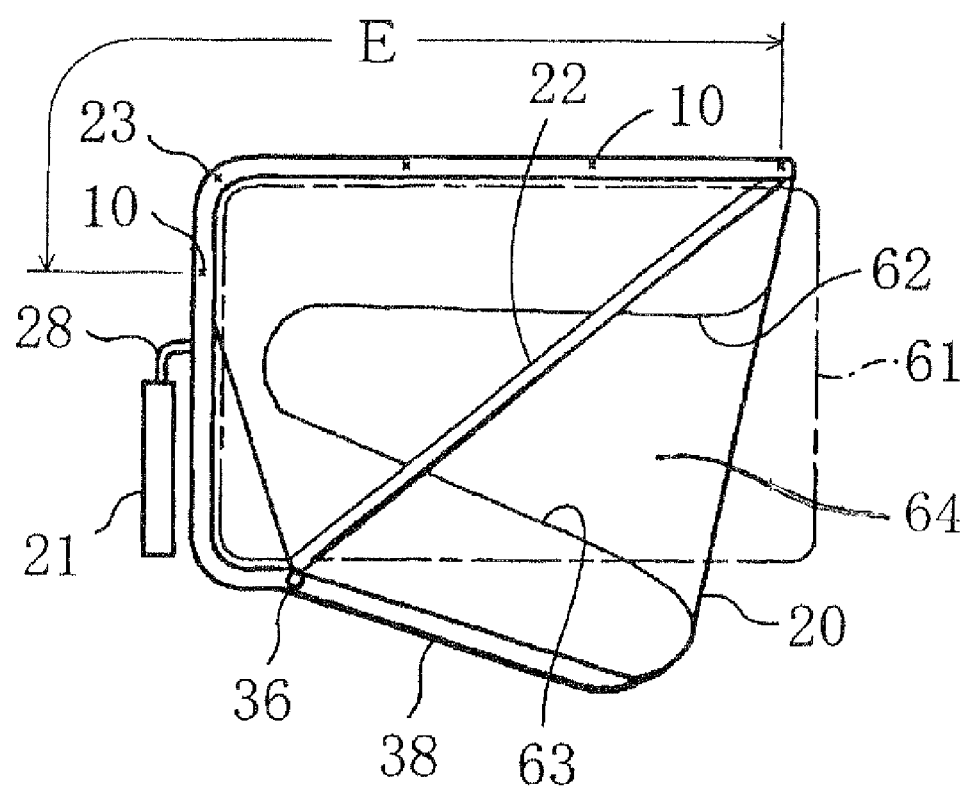
FIG. 23 is an elevation view, when viewed from the vehicle outside, of a curtain airbag device with a curtain in an inflated state according to an embodiment 8 of the present invention.

The present embodiment, which is shown in FIG. 23, is an example in which the present invention is applied to the roof window portion of the vehicle like the embodiment 7. It is a only difference from the embodiment 7 that the quadrilateral-shaped roof window 61 is covered by a single curtain. The curtain airbag device comprises the curtain 20 with inflatable portions, the inflator 21, and the tether 22. like the embodiment 1, The curtain 20 is folded and accommodated in a L-shaped casing 23 that is provided along the first and second window sides of the roof window portion. The curtain 20 comprises a first inflatable portion 62 that extends along the first window side and a second inflatable portion 63 that extends along the third window side. Adjacent inflatable portions are coupled via a non-inflatable web 64. The inflatable portions 62, 63 are connected to each other on the side of the second window side.

The inflator 21, which is substantially the same as that of the embodiment 1, is coupled to the inflatable portion of the curtain via a pipe 28. The controller operates the inflator 21 based on outputs of a sensor to detect the specified state of the vehicle. The casing 23, which is substantially the same as that of the embodiment 1, is supported at an inside of the roof and covered by the head lining from inside, and inflated into the cabin, getting out of a gap that may be formed at the head lining by the inflation force of the curtain 20.

The casing 23 has an extension portion that projects from a second-window-side end in parallel to the first window side, and the support pin 36 as a support portion is provided at this extension portion. Meanwhile, at the side of the inflatable portion 63 of the curtain 20 is provided a band 38 operative to provide a tension line at the curtain 20 in cooperation with the support pin 36. A base-end portion of the curtain 20 is held at a portion of the casing 23 from an entire area of the first window side to a central portion of the second window side. A reference numeral 10 denotes fixed points.

The band 38 is provided in such a manner that its base-end portion is connected to the side face of the second inflatable portion 63 and its tip-end portion is connected to a tip portion of the inflatable portion 63. The support pin 36 is supported at the casing 23 in perpendicular to the window pane so as to get through between the side face of the inflatable portion 63 and the band 38.

In the folded state of the curtain 20, the band 38 is accommodated in the casing 23 along the inflatable portion 63 in such a manner that its tip-end portions is located on the first window side relative to the support pin 36 and its base-end portions is located on a face of the support pin 36 that is directed to the third window side (a side facing the second window side).

Accordingly, as the inflatable portion 63 of the curtain 20 is inflated with the gas supply, its tip portion moves toward the third window side and the tip-end portion of the band 38 also moves toward the third window side and its base-end portion comes to engage with the support pin 36. Thereby, the side portion of the second inflatable portion of the curtain 20 is restrained by the pin 36, so the support pin 36 constitutes a tension applying portion that applies the tension to the curtain 20. Thus, the tension line connecting the pin 36 and the end portion of the casing 23 on the side of the first window side that supports the base end portion of the curtain 20 is provided at the curtain 20.

One end of the tether 22 is connected to the base-end portion of the band 38 and the other end of the tether 22 is connected to the end of the casing 23 on the side of the first window side. The tether 22 is accommodated beside (on the outboard side) the curtain 20 in the casing 23. A range E shows an accommodation area of the tether 22.

Accordingly, the end of the tether 22 moves along with the base-end portion of the band 38 according to the inflation of the curtain 20, and the tether 22 comes to be positioned beside and outside the inflatable portions 62, 63 of the curtain 20 across the roof window portion, namely, they comes to extend laterally along the tension line. A relationship between the length of the tether 22 extending across the window portion and the length of its corresponding portion of the curtain 20 is the same as that of the embodiment 1.

Accordingly, even when as the time lapses, the gas goes out of the inflatable portions 62, 63 and thereby these portions 62, 63 come to shrink and the tension of the line of the curtain 20 becomes weak, the tether 22 can be backup for the curtain 20 and thereby the protection of the passengers can be maintained properly.

Embodiment 9

Figure 24A:
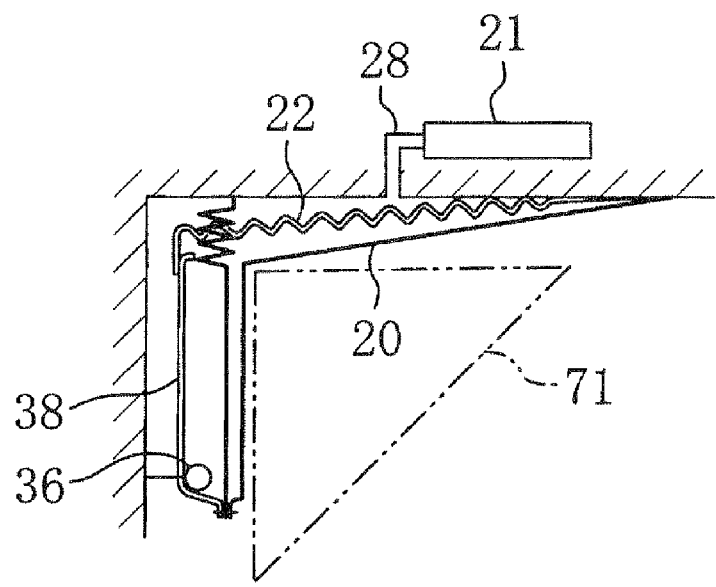
FIG. 24A is a schematic elevation view of a curtain airbag device with a curtain in a folded state according to an embodiment 9 of the present invention.
Figure 24B:
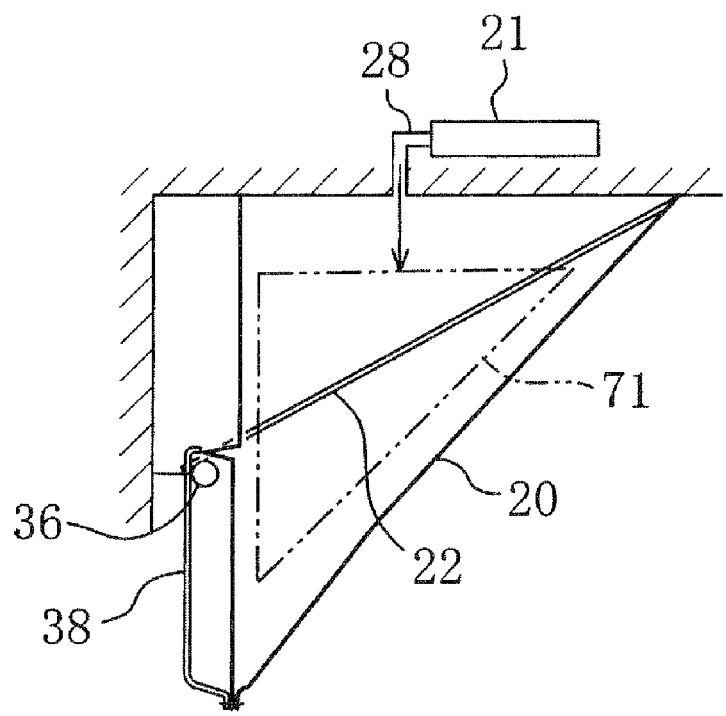
FIG. 24B is a schematic elevation view of the curtain airbag device with the curtain in an inflated state thereof.

The present embodiment, which is schematically shown in FIG. 24A, 24B, relates to a curtain airbag device for covering a triangular window portion 71.

The curtain airbag device comprises the curtain 20 with an inflatable portion (not illustrated) that is inflated by the gas supplied, the inflator 21 as a gas supply device to the gas to the curtain 20, and the tether 22 provided at the curtain 20.

The curtain 20 is folded and accommodated at a portion that is located from the first window side (the upper side in FIGS. 24A and 24B) to a middle portion of the second window side (the left side in the figure) of the triangular window portion. The inflator 21, which is substantially the same as that of the embodiment 1, is coupled to the inflatable portion of the curtain via a pipe 28. The controller operates the inflator 21 based on outputs of the sensor to detect the specified state of the vehicle.

At the second window side of the window portion is provided a support pin 36 as the support portion at a location that is away from the first window side (at a location that is farther away from the first window side than the fixed point of the base-end portion of the curtain). Meanwhile, at a side portion of the curtain 20 on the side of the second window side is provided a band 38 operative to provide a tension line at the curtain 20 in cooperation with the support pin 36.

The band 38 is provided in such a manner that its base-end portion is connected to the side face of the curtain 20 on the side of the second window side and its tip-end portion is connected to a tip portion of the side face of the curtain 20 on the side of the second window side. The support pin 36 is supported substantially in perpendicular to the window pane so as to get through between the side face of the curtain 20 and the band 38.

In the folded state of the curtain 20, the band 38 is accommodated in such a manner that its tip-end portion is located on the first window side relative to the support pin 36 and its base-end portion is located on a face of the support pin 36 that is directed to an opposite side to the first window side.

Accordingly, as the curtain 20 is inflated with the gas supply, as shown in FIG. 24B, its tip portion on the side of the second window side moves away from the first window side so as to cover the triangular window portion 71. The tip-end portion of the band 38 also moves likewise and its base-end portion comes to engage with the support pin 36. Thereby, the side portion of the curtain 20 on the side of the second window side is restrained by the support pin 36, so the support pin 36 constitutes a tension applying portion that applies the tension to the curtain 20. Thus, the tension line connecting the support pin 36 and the end portion on the side of the first window side that supports the base end portion of the curtain 20 is provided at the curtain 20.

One end of the tether 22 is connected to the base-end portion of the band 38 and the other end of the tether 22 is connected to the end portion on the side of the first window side. The tether 22 is accommodated beside (on the outboard side) the curtain 20. Accordingly, the end of the tether 22 moves along with the base-end portion of the band 38 according to the inflation of the curtain 20, and the tether 22 comes to be positioned beside and outside the curtain 20 across the window portion, namely, they comes to extend laterally along the tension line. A relationship between the length of the tether 22 extending across the window portion and the length of its corresponding portion of the curtain 20 is the same as that of the embodiment 1.

Accordingly, even when as the time lapses, the gas goes out of the inflatable portion of the curtain 20 and thereby the inflatable portion comes to shrink and the tension of the line of the curtain 20 becomes weak, the tether 22 can be backup for the curtain 20 and thereby the protection of the passengers can be maintained properly.

Herein, the present invention should not be limited to the above embodiments 1 through 9, but can be applied to any curtain airbag devices for window portions or openings (entrance and exit) of trains, aircrafts, ships, space vehicles and buildings other than automotive vehicles.

Any hook, support hole or the like, instead of the support pin, may be used to restrain the side portion of the curtain as the support portion.

Also, the band and the tether should not be limited to a particular shape, and any kind of shape may be used, such as a string shape or a belt shape.

For example, the tether may be comprised of a wide sheet. Namely, in the state shown in FIG. 18A or 18B where the tether extends to interconnect the fixed portion 10 at the second window side and the support portion corresponding to the support pin 37 when the curtain airbag is inflated, the tether is made of a wide sheet and it may be configured to cover substantially an upper part of the curtain 20 with its one or more fixing points to the first window side. Herein, the fixing points of the sheet tether may be provided at a vehicle body at the first window side or the curtain near the first window side.

What is claimed is:

1. A curtain airbag device, which is applicable to a window portion having one or more windows, comprising:
  a curtain including an inflatable portion, the curtain being configured to be accommodated at least at a roof-side of a periphery of the window portion in a folded state and to be inflated so as to cover at least part of the window portion with the inflatable portion to which gas is supplied;
  a gas supply device operative to supply the gas to the inflatable portion of the curtain;
  a second-window-side support provided at a specified portion of a second window side and a third-window-side support provided at a specified portion of a third window side, the second window side being a front-side periphery of the window portion, and the third window side being a rear-side periphery of the window portion;
  a band provided at a side portion of the curtain, a base-end portion of the band connected to a middle portion of the side portion of the curtain and a tip-end portion of the band connected to a portion that is located at a side of a tip portion of the curtain relative to the middle portion of the side portion of the curtain;
  an engagement portion of the band provided at a side portion of the curtain that is located on a side of the second window side, the engagement portion being configured so as to be located at a position that is closer to the roof-side relative to the second-window-side support in the folded state of the curtain and to be moved toward the second-window-side support so as to engage with the second-window-side support as a tip portion of the curtain moves in an inflation direction according to the inflation of the curtain; and
  a tether, one end of which is connected to one of the engagement portion and a portion of the curtain near the engagement portion at the second window side, and the other end of which is connected to a peripheral portion of the curtain that is restrained by a specified portion of the periphery of the window portion when the curtain is in an inflated state, the tether being configured so as to be accommodated at the periphery of the window portion with the curtain and to extend according to the inflation of the curtain from a side of the second-window-side support to a side of the specified portion of the periphery of the window portion across the window portion, whereby a tension can be provided to the curtain;
  wherein said second-window-side support is configured to be located between the side portion of the curtain and the band such that the tip-end portion of the band is located on a side of the second-window-side support that is opposite to the roof-side in the folded state of the curtain and the base-end portion of the band as said engagement portion is moved toward the second-window-side support so as to engage with the second-window-side support according to the inflation of the curtain.

2. The curtain airbag device of claim 1, wherein the second-window-side support is provided at the specified portion of the second window side, the third-window-side support is provided at the specified portion of the third window side that is provided next to the roof-side on an opposite side to the second window side, the engagement portion of the band comprises a second-window-side engagement portion and a third-window-side engagement portion, the second-window-side engagement portion being provided at the side portion of the curtain that is located on the side of the second window side and being configured so as to be located at the position that is closer to the roof-side relative to the second-window-side support in the folded state of the curtain and to be moved toward the second-window-side support so as to engage with the second-window-side support as the tip portion of the curtain moves in the inflation direction according to the inflation of the curtain, the third-window-side engagement portion being provided at a side portion of the curtain that is located on a side of the third window side and being configured so as to be located at a position that is closer to the roof-side relative to the third-window-side support in the folded state of the curtain and to be moved toward the third-window-side support so as to engage with the third-window-side support as the tip portion of the curtain moves in the inflation direction according to the inflation of the curtain, and said tether connects the second-window-side engagement portion or a portion near the second-window-side engagement portion of the curtain to the third-window-side engagement portion or a portion near the third-window-side engagement portion of the curtain, the tether being configured so as to be accommodated at the periphery of the window portion with the curtain and to extend according to the inflation of the curtain across the window portion from the second window side to the third window side, whereby a tension can be provided to the curtain between the second-window-side support and the third-window-side support.

3. The curtain airbag device of claim 1, wherein the curtain is configured to cover the window portion of a vehicle, and said tether is configured to extend outside the inflatable portion of the curtain in the inflated state.

4. The curtain airbag device of claim 1, wherein said tether is configured to extend beside the inflatable portion of the curtain in the inflated state.

5. The curtain airbag device of claim 1, wherein the curtain is configured to cover the window portion of a vehicle, and said gas supply device is operative to supply the gas to the inflatable portion of the curtain at least when a crash of the vehicle is predicted, the crash of the vehicle is detected, or a rollover the vehicle is determined.

6. The curtain airbag device of claim 1, wherein the inflatable portion of the curtain is provided near said engagement portion.

7. The curtain airbag device of claim 1, wherein the curtain is configured to be inflated in such a manner that the tip portion moves beyond an edge of the window portion.

8. The curtain airbag device of claim 1, wherein an angle formed between the roof-side and the second window side is approximately 130 degrees or less, and the curtain is configured to be accommodated at the roof-side and the second window side of the window portion.

9. The curtain airbag device of claim 1, wherein the curtain is configured to cover the window portion of a side window of a vehicle, and said tether is configured to extend longitudinally at a specified level that is higher than a belt line of the vehicle and lower than an upper end of a headrest of a vehicle seat.

10. A curtain airbag device, which is applicable to a window portion having one or more windows, comprising:

a curtain including an inflatable portion, the curtain being configured to be accommodated at least at a roof-side of a periphery of the window portion in a folded state and to be inflated so as to cover at least part of the window portion with the inflatable portion to which gas is supplied;

a gas supply device operative to supply the gas to the inflatable portion of the curtain;

a support provided at a specified portion of a second window side, the second window side being a front-side periphery of the window portion;

a band provided at a side portion of the curtain, a base-end portion of the band is connected to a fixed portion that is fixed at the periphery of the window portion or a portion near the fixed portion of the periphery of the window portion and a tip-end portion of the band is connected to a tip portion of the side portion of the curtain;

an engagement portion of the band provided at a side portion of the curtain that is located on a side of the second window side, the engagement portion of the band being configured so as to be located at a position that is closer to the roof-side relative to the support in the folded state of the curtain and to be moved toward the support so as to engage with the support as a tip portion of the curtain moves in an inflation direction according to the inflation of the curtain; and a tether, one end of which is connected to one of the engagement portion and a portion near the engagement portion of the curtain at the second window side, and the other end of which is connected to a peripheral portion that is restrained by a specified portion of the periphery of the window portion at other than the second window side when the curtain is in the inflated state, the tether being configured so as to be accommodated at the periphery of the window portion with the curtain and to extend according to the inflation of the curtain from a side of the support to a side of the specified portion of the periphery of the window portion across the window portion, whereby a tension can be provided to the curtain, wherein said support is configured to be located between the side portion of the curtain and the band such that the tip end portion of the band is located on a side of the support portion that is opposite to the roof-side in the folded state of the curtain and a middle portion of the band as said engagement portion is moved toward the support so as to engage with the support according to the inflation of the curtain, wherein a length of the band from a point of said support to a point connecting to the tip portion of the curtain at the inflation of the curtain is configured to be a half or more of a length of the side portion of the curtain from said fixed portion to a tip end of the curtain.

11. The curtain airbag device of claim 10, wherein the fixed portion of the side portion of the curtain is fixed to the roof-side or a border of the roof-side side with the second window side.

* * * * *

UNITED STATES PATENT AND TRADEMARK OFFICE
CERTIFICATE OF CORRECTION

| | | |
|---|---|---|
| PATENT NO. | : 7,661,701 B2 | Page 1 of 1 |
| APPLICATION NO. | : 11/503137 | |
| DATED | : February 16, 2010 | |
| INVENTOR(S) | : Motoharu Hirata | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 456 days.

Signed and Sealed this

Thirtieth Day of November, 2010

David J. Kappos
*Director of the United States Patent and Trademark Office*